US009734768B1

(12) United States Patent
Shapiro et al.

(10) Patent No.: US 9,734,768 B1
(45) Date of Patent: Aug. 15, 2017

(54) USER-MANIPULATED CODED IMAGE DISPLAY AND ANIMATION SYSTEM

(71) Applicants: Ted Shapiro, New York, NY (US); Rufus Butler Seder, Arlington, MA (US)

(72) Inventors: Ted Shapiro, New York, NY (US); Rufus Butler Seder, Arlington, MA (US)

( * ) Notice: Subject to any disclaimer, the term of this patent is extended or adjusted under 35 U.S.C. 154(b) by 169 days.

(21) Appl. No.: 14/624,556

(22) Filed: Feb. 17, 2015

Related U.S. Application Data

(60) Provisional application No. 61/940,155, filed on Feb. 14, 2014.

(51) Int. Cl.

| | |
|---|---|
| ***G09F 19/00*** | (2006.01) |
| ***G09G 3/34*** | (2006.01) |
| ***G06T 13/80*** | (2011.01) |
| ***G09G 3/00*** | (2006.01) |
| ***G09F 13/34*** | (2006.01) |

(52) U.S. Cl.
CPC ........... *G09G 3/3433* (2013.01); *G06T 13/80* (2013.01); *G09F 13/34* (2013.01); *G09G 3/003* (2013.01)

(58) Field of Classification Search
CPC ... G09F 13/34; G09F 2011/0009; G09F 11/24
USPC .......................................... 40/436, 437, 438
See application file for complete search history.

(56) References Cited

U.S. PATENT DOCUMENTS

| | | | |
|---|---|---|---|
| 29,430 | A | 7/1860 | Ames |
| 725,567 | A | 4/1903 | Ives |
| 762,519 | A | 6/1904 | Farrand |
| 829,492 | A | 8/1906 | Spiegel |
| 829,902 | A | 8/1906 | Urry |
| RE13,109 | E | 5/1910 | Spiegel |
| 1,150,374 | A | 8/1915 | Kanolt |
| 1,259,297 | A | 3/1918 | Russell |
| 1,260,682 | A | 3/1918 | Kanolt |
| 1,285,753 | A | 11/1918 | Lowenstein |
| 1,474,572 | A | 11/1923 | Whitstock |
| 1,475,430 | A | 11/1923 | Curwen |
| 2,058,581 | A | 10/1936 | Fegan |
| 2,085,803 | A | 7/1937 | Harrison |
| 2,246,001 | A | 6/1941 | Powers |

(Continued)

*Primary Examiner* — Kristina N Junge

(74) *Attorney, Agent, or Firm* — Thomas P. O'Connell; O'Connell Law Firm

(57) ABSTRACT

A coded image display and animation system with an illuminated shutter element device that permits the user, by placing individual coded image members and combinations of coded image members upon it, to create collages, puzzles and fantasy worlds that instantly appear to come to life and move realistically. Coded image members can be chosen and selectively repositioned, overlapped, and combined for varying displays and display effects. Larger, window-sized displays with or without coded image portions can be exploited, potentially to provide moving backgrounds, such as falling snow or moving clouds, upon which the coded image members can be positioned thereby permitting the user to create multi-member displays and animations, including animated stories and animated fantasy worlds. Coded image members and non-coded image members can have open portions for permitting the application of images or image portions by users, such as by erasable marking implements.

33 Claims, 32 Drawing Sheets

(56) References Cited

U.S. PATENT DOCUMENTS

| | | | |
|---|---|---|---|
| 2,367,967 A | | 1/1945 | Schwartz |
| 2,374,371 A | | 4/1945 | Morch |
| 2,398,257 A | | 4/1946 | Schwartz |
| 2,482,947 A | | 9/1949 | Swarbrick |
| 2,876,570 A | | 3/1959 | Swarbrick |
| 2,915,843 A | | 12/1959 | Pabst et al. |
| 2,917,854 A | | 12/1959 | Swarbrick |
| 2,918,743 A | | 12/1959 | Swarbrick |
| 3,000,125 A | | 9/1961 | Elvestrom |
| 3,082,560 A | | 3/1963 | Elvestrom |
| 3,145,250 A | | 8/1964 | Vargady |
| 3,235,987 A | | 2/1966 | Yates |
| 3,268,238 A | | 8/1966 | Finkel |
| 3,314,179 A | | 4/1967 | Leach |
| 3,370,371 A | | 2/1968 | Swarbrick |
| 3,484,969 A | | 12/1969 | Newland |
| 3,589,045 A | | 6/1971 | Rakowsky |
| 3,643,361 A | | 2/1972 | Eaves |
| 3,745,966 A | | 7/1973 | Seager |
| 3,961,434 A | | 6/1976 | Sampon |
| 4,118,879 A | * | 10/1978 | Simon .................... G09F 13/34 40/437 |
| 4,885,193 A | | 12/1989 | Head |
| 5,197,886 A | | 3/1993 | Sekiguchi |
| 5,588,526 A | | 12/1996 | Fantone et al. |
| 5,695,346 A | | 12/1997 | Sekiguchi et al. |
| 5,823,344 A | | 10/1998 | Fantone et al. |
| 5,901,484 A | | 5/1999 | Seder |
| 6,286,873 B1 | | 9/2001 | Seder |
| 7,000,343 B1 | | 2/2006 | Teichman |
| 7,151,541 B2 | | 12/2006 | Seder |
| 7,331,132 B1 | | 2/2008 | Seder |
| 2002/0105808 A1 | | 8/2002 | Ting Yup |
| 2003/0070333 A1 | | 4/2003 | Usher et al. |
| 2010/0018091 A1 | * | 1/2010 | Rosendale ........... B42D 15/047 40/442 |

* cited by examiner

USER-MANIPULATED CODED IMAGE DISPLAY AND ANIMATION SYSTEM

FIELD OF THE INVENTION

The present invention relates generally to display devices. More particularly, disclosed herein is a coded image animation and display system wherein coded images can be selectively applied and manipulated by a user to produce unique displays and animations of coded images and combinations thereof.

BACKGROUND OF THE INVENTION

Devices permitting the sequential display of a plurality of coded images by movement of an image member relative to a shutter member have been known for many years. In a typical arrangement, the image member retains a plurality of interposed coded images while the shutter member retains a plurality of shutter elements that are separated by a plurality of viewing elements. The shutter elements perform dual functions. They selectively obscure from view all but one of the interposed coded images, and they bridge the gaps between the coded strips that cooperate with the shutter elements to form what can be termed an active image. With this, the plurality of shutter elements decode the active image so that it appears to be a complete, coherent image.

When the image member and the shutter member undergo relative movement by a predetermined amount, the strips of a previously active image become concealed and the next succeeding coded image assumes what may be a fleeting position as the active image. This transition from image to image will continue through a cycle of the coded images that are disposed on the image member. Once the cycle is complete, the first coded image will again appear thereby starting a new, identical cycle. The coded images can be sequential, such as a series of images of a horse galloping. Alternatively, the coded images can be related, such as a related series of words or graphics. Still further, the plurality of coded images could be unrelated.

In typical coded image animation, the image member and the coded images retained thereon are typically pre-determined. As a result, apart perhaps from choosing the device itself, the user typically has little control over the images to be displayed during coded image animation. Indeed, in prior art coded image animation devices, the coded image member is normally disposed under the shutter element member so that one cannot easily interact with the coded image member. Moreover, the image member is typically fixed in angular position relative to the shutter member so that the user's control over the nature and quality of the animation is extremely limited in the case of user-actuated devices and substantially non-existent in motorized or automated devices.

With an awareness of these and further limitations of the prior art, the present inventors appreciated that a coded image display and animation system capable of permitting users to select coded images to be animated and to combine those images in selected ways would represent a useful advance in the art. The inventors further appreciated that providing a coded image display and animation system that permits—indeed challenges—users to manipulate and orient coded image members relative to one or more shutter members would provide improved play, entertainment, developmental, and educational value to users.

SUMMARY OF THE INVENTION

Accordingly, the present invention has as its most broadly stated object the providing a coded image display and animation system wherein users can freely select, apply, manipulate, and remove individual or combinations of coded image members to produce and control the nature and quality of image displays directly.

A further object of the invention is to provide a coded image display and animation system under which users are directly engaged in manipulating and orienting selected coded image members to yield improved developmental, educational, entertainment, and play value to users and observers.

Another object of embodiments of the invention is to provide such a coded image display and animation system wherein images can be displayed with crispness and clarity.

Still another object of embodiments of the invention is to provide a coded image display and animation system wherein displayed images and scenes of images can be infinitely varied.

In certain embodiments, a further object of the invention is to provide a coded image display and animation system wherein unique, potentially erasable, images can be created by a user and, potentially, displayed in cooperation with fixed coded or non-coded images.

Yet another object of manifestations of the invention is to provide a coded image display and animation system wherein a given display can be created by applying multiple images in combination, such as in the creation of complete characters from individual display components.

These and further objects and advantages of embodiments of the invention will become obvious not only to one who reviews the present specification and drawings but also to one who has an opportunity to make use of an embodiment of the coded image display and animation system as disclosed herein. It will be appreciated, however, that, although the accomplishment of each of the foregoing objects in a single embodiment of the invention may be possible and indeed preferred, not all embodiments will seek or need to accomplish each and every potential object and advantage. Nonetheless, all such embodiments should be considered within the scope of the invention.

In carrying forth one or more of the foregoing objects of the invention, an embodiment of the coded image display and animation system can be considered to be founded on a shutter element device with a plurality of shutter elements and interposed viewing elements. The shutter element device has a display and animation window and a mechanism for displaying and providing visually perceived movement of the shutter elements and the interposed viewing elements. There is at least one loose coded image member for being applied to the display and animation window of the shutter element device. Each coded image member has at least one coded image thereon to produce a perception of animation in response to a perceived movement of the shutter elements and the interposed viewing elements. Under this construction, the at least one loose coded image member can be selectively applied to the display and animation window of the shutter element device and the coded image on the coded image member can be animated by a visually perceived movement of the shutter elements and the interposed viewing elements. Embodiments of the system are contemplated wherein there are plural loose coded image members for being applied to the display and animation window of the shutter element device with each coded image member having at least one coded image thereon.

In certain manifestations of the invention, the mechanism for displaying and providing visually perceived movement of the shutter elements and the interposed viewing elements can take the form of a mechanical drive mechanism, and the plurality of shutter elements and interposed viewing elements can be disposed on a shutter member. In other embodiments of the invention, the mechanism for displaying and providing visually perceived movement of the shutter elements and the interposed viewing elements could comprise an electronic display, such as the display of a computer or mobile device with a movable graphic display of shutter elements and interposed viewing elements.

Where the mechanism for displaying and providing visually perceived movement of the shutter elements and the interposed viewing elements comprises a mechanical drive mechanism, the shutter member can comprise a belt disposed in a continuous loop. The plurality of shutter elements and interposed viewing elements can be disposed on the belt, and the belt can be retained by first and second rollers.

Other mechanical drive mechanisms are possible and within the scope of the invention except as it might be expressly limited by the claims. For example, it would alternatively be possible for the mechanical drive mechanism to comprise a reciprocating mechanism that cyclically moves a shutter element member in a first direction, which can be perpendicular to the orientation of the shutter elements and the interposed viewing elements, and then in a second direction opposite to the first direction. Such a movement could be actuated in numerous ways. In one such embodiment, for example, a snap-back mechanism could be provided where the shutter element member is advanced in the first direction in a given, controlled speed and then snapped back in the second direction at a high speed so that animation can appear to be substantially continuous. Such a movement could be created, for example, by a cam mechanism with a progressively broadening cam profile that produces movement in the first direction followed by a steep ridge that produces movement in the second direction.

The animation window of the shutter element device has a first surface and a second surface. The first surface can be open to receive the at least one coded image member, and the shutter member can be disposed in substantial contact with the second surface of the animation window. For example, where the shutter member comprises a belt disposed in a continuous loop and the belt is retained by first and second rollers, the second surface of the animation window can disposed proximal to a tangent line from the first roller to the second roller thereby ensuring continuous contact between the shutter member and the second surface of the animation window. Where the shutter member is disposed in contact with the second surface of the animation window, the plurality of shutter elements and interposed viewing elements can have a pitch greater than the pitch of the at least one coded image on the at least one coded image member.

To aid in the alignment of coded image members, the shutter element device can further include a raised edge adjacent to the display and animation window. More particularly, where the plurality of shutter elements and interposed viewing elements have an orientation, the raised edge can be substantially parallel or perpendicular to the orientation of the plurality of shutter elements and interposed viewing elements. In particular embodiments of the invention, edges can be disposed both parallel and perpendicular to the orientation of the plurality of shutter elements and interposed viewing elements. Moreover, the at least one coded image member can be rectangular and can have coded images slices parallel to opposed edges of the at least one coded image member.

While the dimensions and movement of the coded image display and animation system can vary, embodiments are contemplated where the plurality of shutter elements are approximately 1/16 inch wide and where the shutter element device produces visually perceived movement of the shutter elements at between 1/8 and 3/16 inches per second. Alternative embodiments are contemplated wherein the plurality of shutter elements are approximately 1/32 inch wide while the shutter element device produces visually perceived movement of the shutter elements at between 1/16 and 3/32 inches per second.

Manifestations of the coded image display and animation system can further include at least one display sheet. By way of example, the display sheet can have at least one localized coded image portion with at least one coded image and at least one localized non-coded image portion. The non-coded image portion of the display sheet could, for example, be decorated with a static image. In other embodiments, the non-coded image portion of the display sheet can additionally or alternatively include a freehand drawing portion, which could be free of coded images or that could include coded image portions, for receiving freehand drawings. In any case, the display sheet could have a size approximating a size of the display and animation window, or it could be differently sized, such as by being smaller.

It is even further possible where there are plural coded image members that the at least one display sheet and the plural coded image members could be mutually adherent. With that, multiple coded image members could be applied to and retained by the at least one display sheet thereby permitting unified designs to be created and retained.

It is also possible for the at least one coded image member to have at least one localized coded image portion with at least one coded image and at least one localized non-coded image portion. The non-coded image portion could have a freehand drawing portion for receiving freehand drawings.

Again where there are plural coded image members, each coded image member could have a coded image portion thereon that is a portion of an overall animating image. Under such constructions, the plural coded image members can be assembled into the overall animating image. In other embodiments, the plural coded image members can be slidably interlocked. In still other embodiments, the each coded image member could have a coded image portion thereon that is representative of at least a portion of a game piece of a board game. Still further, it would be possible to have a coded image member that is three-dimensional with a coded image portion and a contoured non-coded image portion.

To promote positioning of the coded image members, the system could further include at least one spacer member that could be rectangular in shape. The spacer member could have a handle. Still further, where the animation window of the shutter element device has a first surface and a second surface and where the plurality of shutter elements and interposed viewing elements are disposed with a given orientation, the first surface can have at least one ridge aligned with the orientation of the plurality of shutter elements and interposed viewing elements to permit alignment of the coded image members.

One will appreciate that the foregoing discussion broadly outlines the more important goals and features of the invention to enable a better understanding of the detailed description that follows and to instill a better appreciation of the inventors' contribution to the art. Before any particular embodiment or aspect thereof is explained in detail, it must be made clear that the following details of construction and illustrations of inventive concepts are mere examples of the many possible manifestations of the invention.

DETAILED DESCRIPTION OF PREFERRED EMBODIMENTS

Figure 1:
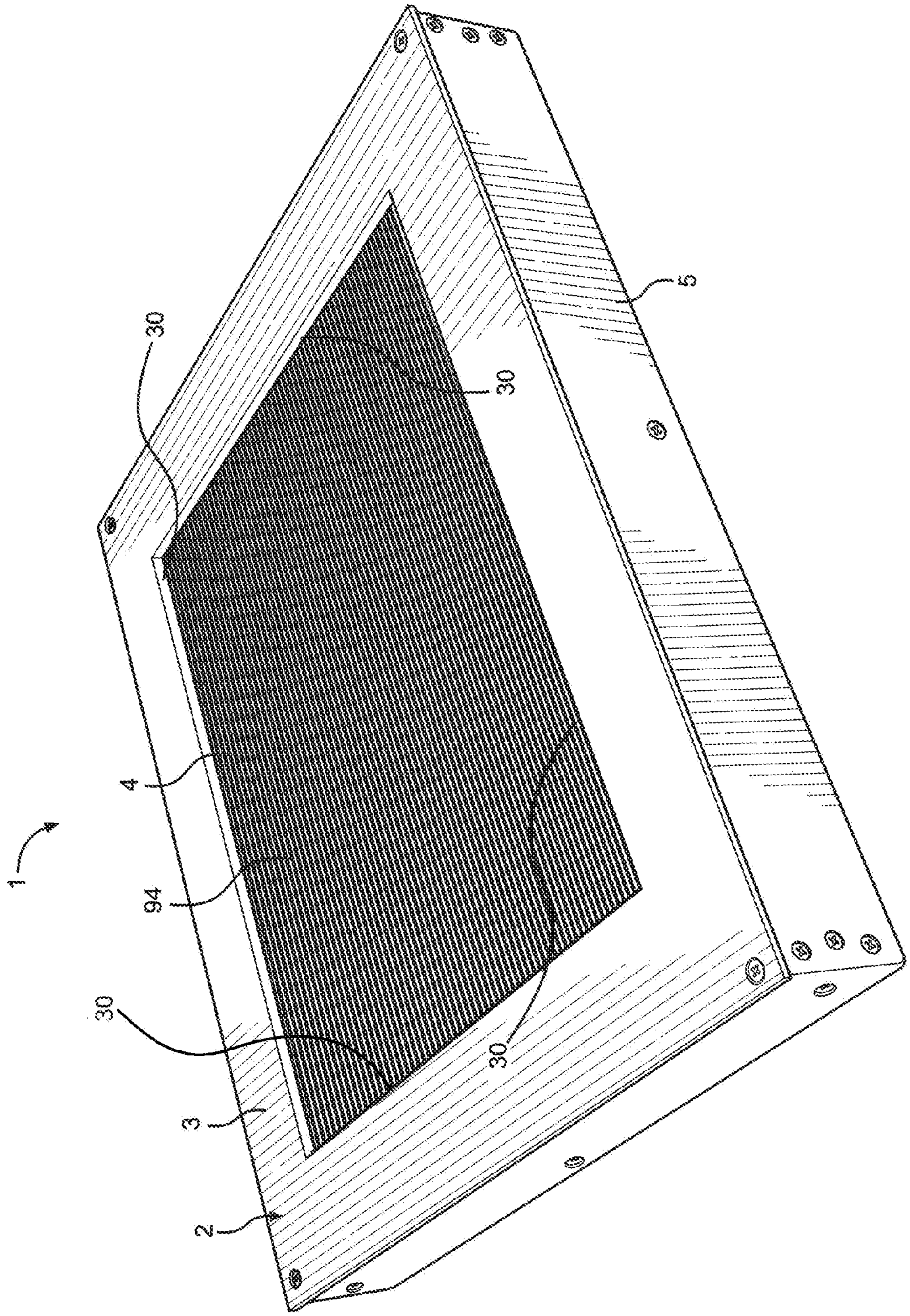
FIG. 1 is a perspective view of an illuminated shutter element device for use under the coded image display and animation system disclosed herein.

The coded image display and animation system disclosed herein is subject to a wide variety of embodiments. However, to ensure that one skilled in the art will be able to understand and, in appropriate cases, practice the present invention, certain preferred embodiments of the broader invention revealed herein are described below and shown in the accompanying drawing figures. Therefore, before any particular embodiment of the invention is explained in detail, it must be made clear that the following details of construction and illustrations of inventive concepts are mere examples of the many possible manifestations of the invention.

In seeking to meet the objects of the invention referenced above, the present inventors appreciated that conventional barrier grid animation is most often viewed front-lit under normal lighting conditions. The shutter member is normally positioned over the coded image member so that the black shutter elements shield the inactive coded images while appearing to complete the active coded image. The blocking of the inactive coded images by the shutter elements is critical to crisp and clear display and animation.

To permit user to select, apply, manipulate, and remove individual coded image members or combinations of coded image members to produce and control the nature and quality of image displays directly, it was determined that the traditional configuration would ideally be reversed with the shutter member then positioned to underlie selectively chosen and placed coded image members. Nonetheless, it must be borne in mind that at least some of the inventive concepts disclosed herein could have application to configurations where a shutter member is disposed atop one or more coded image members, and the invention should be limited only as may expressly be set forth in the claims. However, such a configuration presents issues to be overcome. For instance, when front-lit under normal lighting conditions, coded images meant to be inactive are no longer concealed beneath the shutter elements thereby compromising the animation effect.

It was thus further determined that improved performance is realized by backlighting the display and animation area, but it should be again appreciated that inventive concepts disclosed herein could be exploited even without backlighting. In preferred practices of the invention, the surface upon which the coded image members can be placed will be backlit sufficiently to cause illumination to exceed average ambient lighting conditions, potentially by more than double. The illumination creates a silhouette effect in which the primary light source for the invention is the illuminated shutter element device or tablet disclosed herein. With that, the source of illumination so disposed directly behind the shutter elements, the shutter elements effectively mask the inactive coded images disposed atop the shutter elements while permitting a viewing of the active coded image. To accomplish this, the shutter elements could be solid colored, such as black, to be as opaque and light-blocking as possible. Moreover, the coded image members could be solid colored with opacity corresponding to that of the shutter elements.

Looking more particularly to the drawings, an illuminated shutter element device operative pursuant to the coded image display and animation system disclosed herein is indicated generally at 1 in, for instance, FIG. 1. There, the illuminated shutter element device 1 takes the form of a tablet, but other configurations are possible except as the invention might expressly be limited. Although not depicted herein, the device 1 could additionally incorporate a mechanism for providing a fixed or adjustable tilting of the device 1 toward the user. By way of example and not limitation, the case 5 could have fixed or adjustable legs, risers, or even a projecting housing for batteries on the back thereof.

The shutter element device 1 is formed externally by a case 5 and a top plate 2. The top plate 2 has a window frame 3 and a window 4. The window frame 3 is made of a rigid material, such as ⅛" ABS plastic, surrounding a hole defined by window recess edges 30. The opening defined by the window recess edges 30 is preferably, though not necessarily, square or rectangular in shape. In such embodiments, the window 4 is a square or rectangular piece of rigid, transparent material of approximately between 1/32" and 1/16" in thickness, such as ABS plastic, though other rigid, transparent materials and thicknesses are possible.

Figure 3:
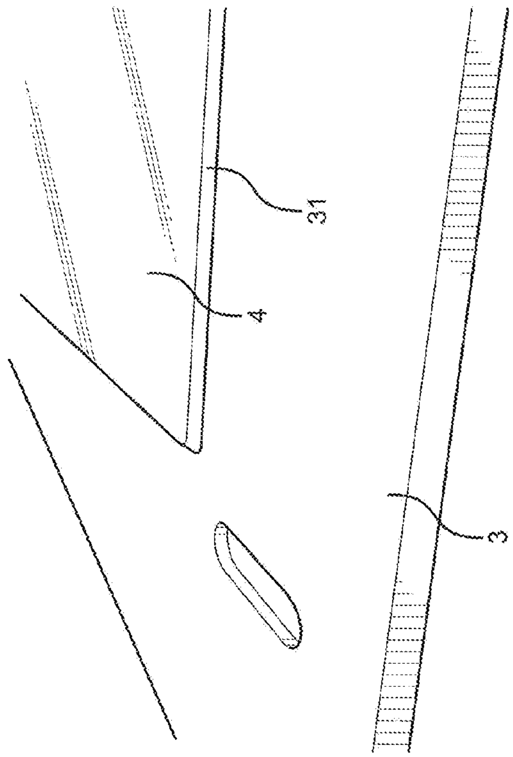
FIG. 3 is an amplified perspective view of a further portion of the animation frame of FIG. 2.
Figure 2:
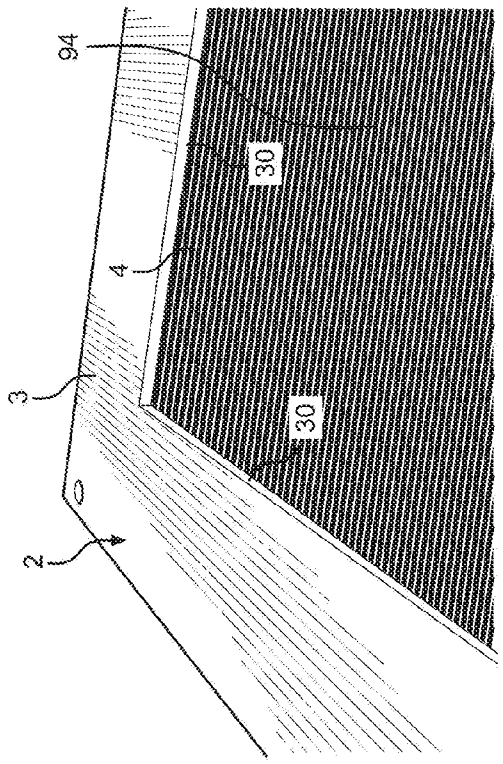
FIG. 2 is an amplified perspective view of a portion of an animation frame for the shutter element device of FIG. 1.

With combined reference to FIGS. 2 and 3, the window 4 is shown to be mounted to the window frame 3. The window 4 is slightly larger than the opening in the window frame 3 and is mounted around its perimeter to the underside of window frame 3. This mounting around the entire perimeter provides additional rigidity to window 4. With this, the upper surface of the window 4 is coplanar with the underside surface of window frame 3. In FIG. 3, one can perceive edge 31, where the lower or underside surface of window 4 is raised from the underside, bottom surface of window frame 4. The significance of this is explained below. As shown again in FIGS. 1 and 2, the upper surface of window 4 is recessed below the planar surface of window frame 3 thereby forming a well or work area 94 that is defined on its sides by window recess edges 30.

Figure 4:
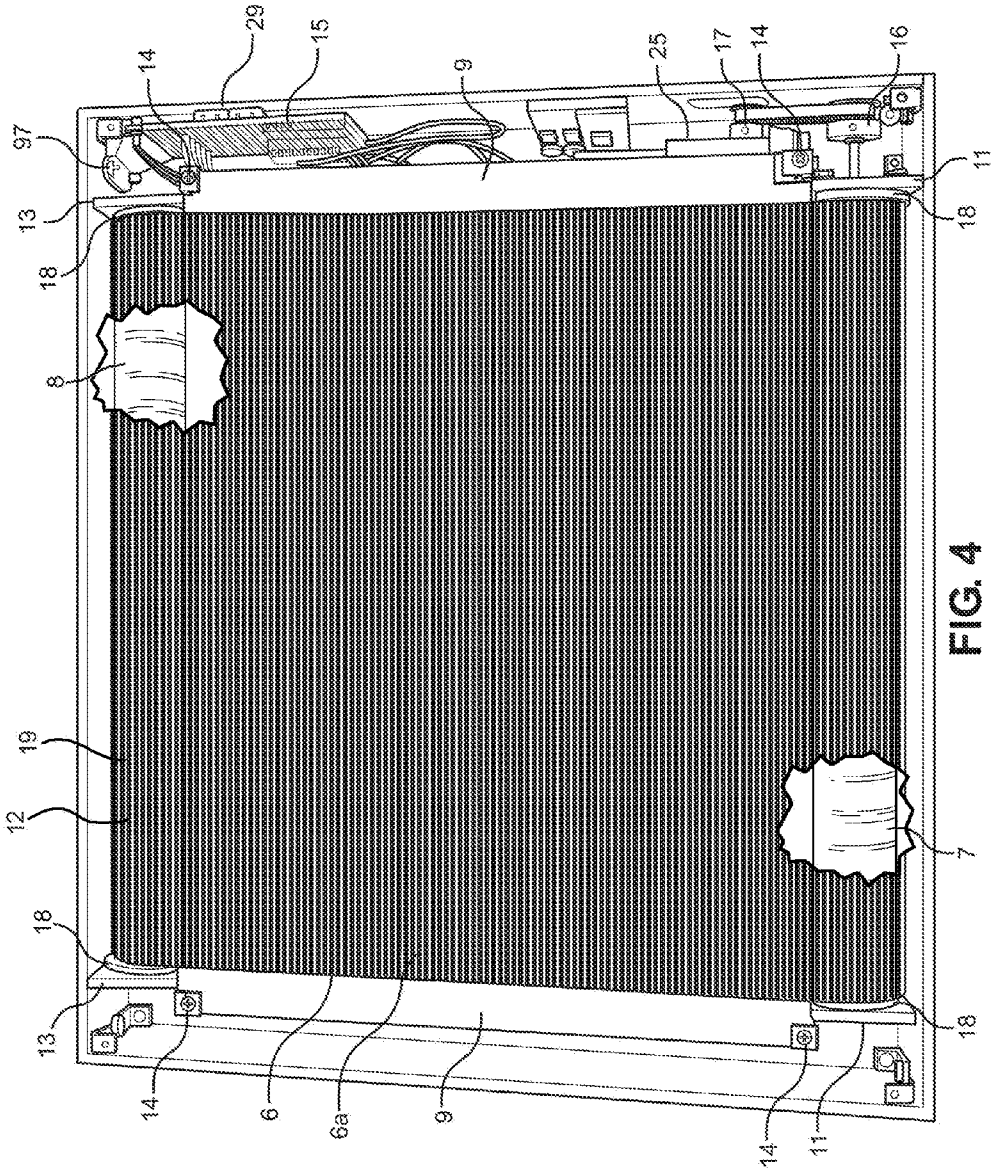
FIG. 4 is a top plan view of the illuminated shutter element device of FIG. 1 in a partially disassembled form with the animation frame removed for clarity of understanding.
Figure 5:
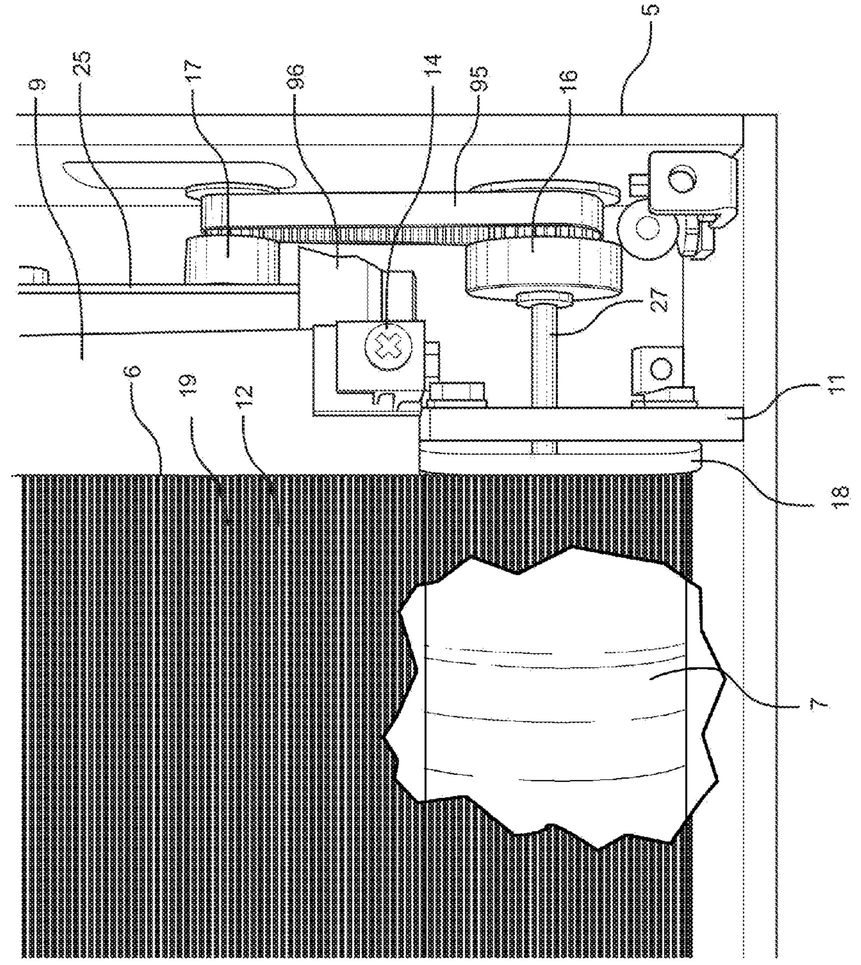
FIG. 5 is an amplified top plan view of the drive system of the illuminated shutter element device of FIG. 1, again with the animation frame removed for clarity of understanding.
Figure 6:
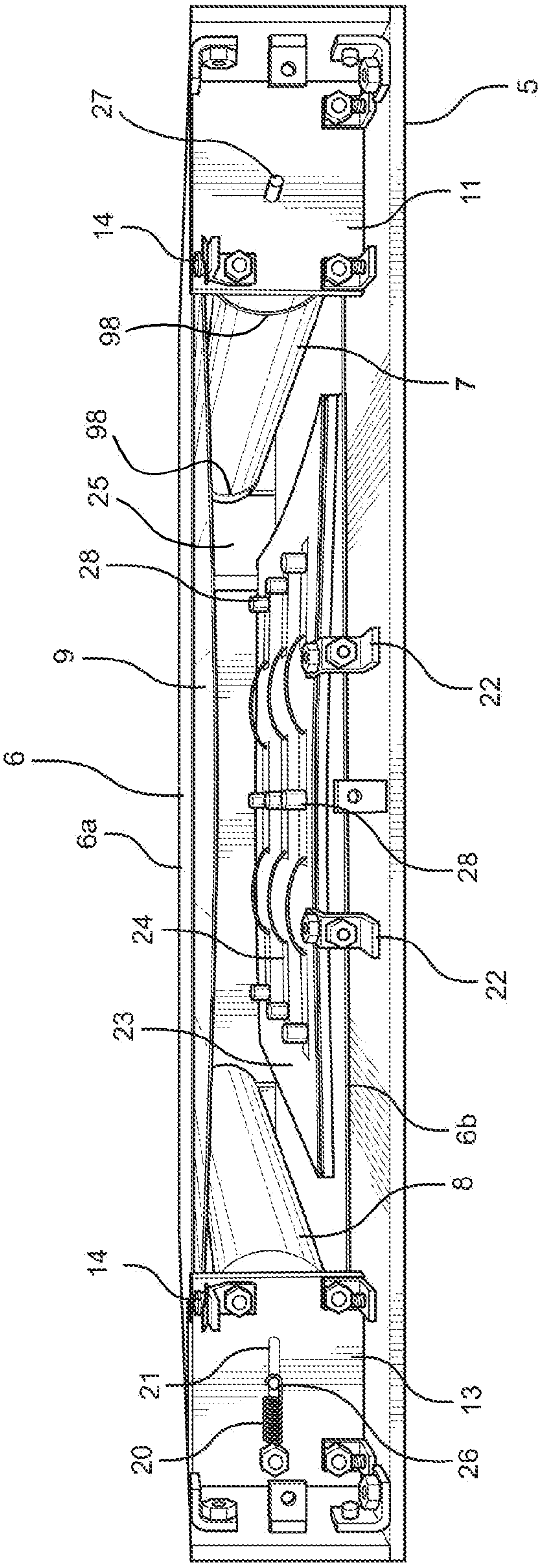
FIG. 6 is a view in side elevation of the illuminated shutter element device of FIG. 1 in a partially disassembled form with a sidewall removed for clarity of understanding.
Figure 7:
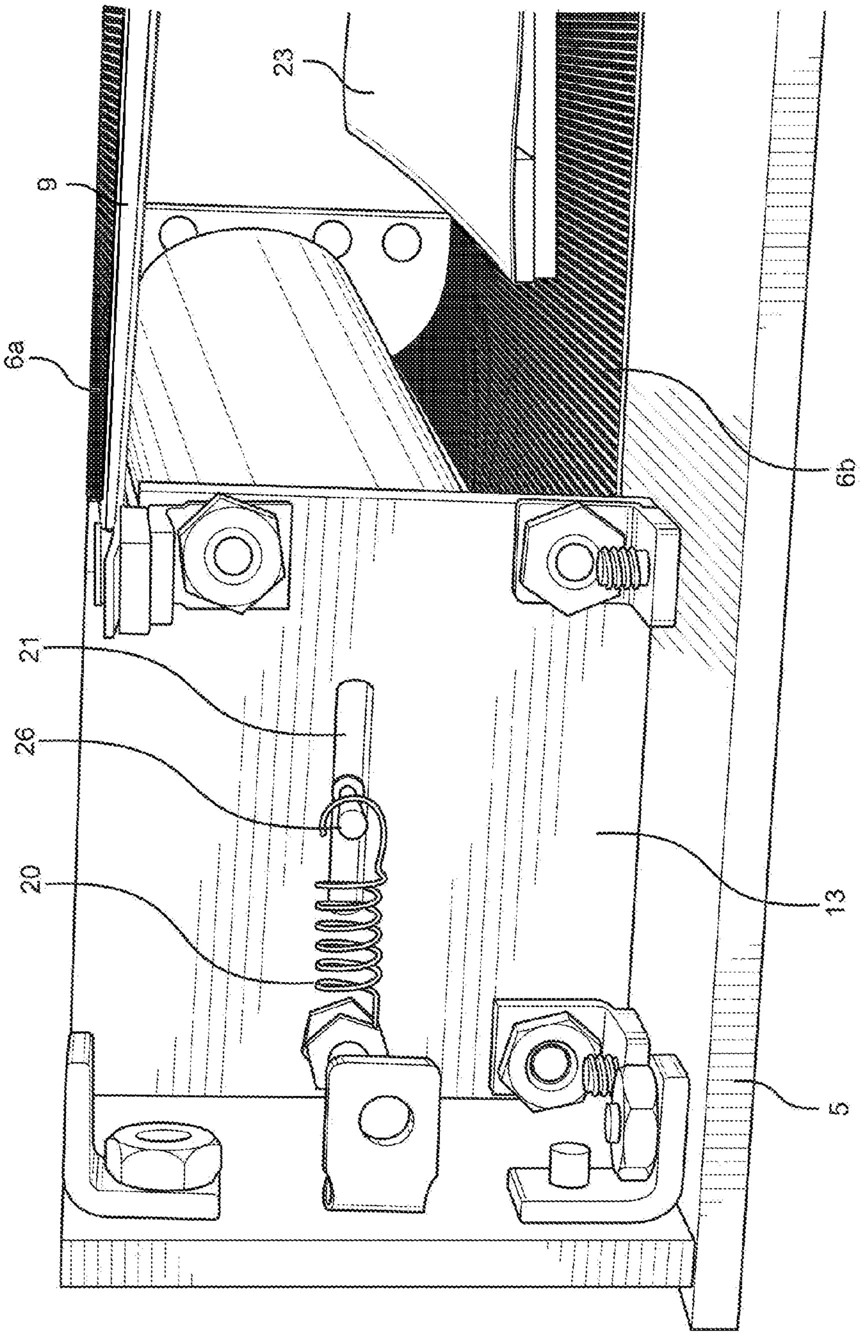
FIG. 7 is an amplified view in side elevation of a tensioning mechanism of the illuminated shutter element device of FIG. 1, again with a sidewall removed for clarity of understanding.

The inner workings of this embodiment of the shutter element device 1 can be better understood by reference to the top plan views of FIGS. 4 and 5 of the device 1 with the top plate 2 removed to expose the internal components. In FIGS. 6 and 7, side elevational views of the device 1 are presented, again showing the internal components.

By combined reference to FIGS. 4 through 7, one sees that a belt 6 is formed as a continuous loop. The belt 6 has a continuous series of opaque shutter elements 12 separated by interposed translucent or transparent viewing elements 19 whereby the belt 6 forms a shutter member 6. In one embodiment, the belt 6 could be formed from clear acetate film or any other suitable material. The substrate forming the continuous belt 6 can, in a preferred example, be clear, thin, flexible, resilient, potentially frosted or otherwise light-diffusing material of approximately 0.003 inches in thickness with it being understood that the thickness may vary within the scope of the invention depending on, for example, the material employed and the mechanical demands of the animation system. The shutter elements 12 can be formed on the belt 6 as by printing or any other application technique to form opaque, potentially black shutter elements 12 disposed perpendicularly to the direction of movement of the belt 6 during operation of the device 1. The depicted belt 6 is approximately 8 inches wide and 18 inches in circumference, but other dimensions are, of course, contemplated.

Although the shutter member 6 could be driven in a reciprocating or other pattern, the belt 6 in the depicted embodiment is driven in a continuous loop by rollers 7 and 8. In this example, roller 7 can act as a drive roller, and roller 8 can act as a tension roller 8. The device 1 can be considered to have an upper surface for permitting display and animation as disclosed herein, a lower surface, first and second longitudinal or left and right side edges, and first and second latitudinal or upper and lower edges. The rollers 7 and 8 are positioned adjacent to the first and second latitudinal edges respectively so that the belt 6 is held under tension. The drive roller 7 is supported on each end by supports 11, each with a hole to receive drive roller pins 27. The tension roller 8 is supported on each end by supports 13, each with a hole to receive tension roller pins 26. As shown in FIG. 6 and in more detail in FIG. 7, tension roller supports 13 have a slot 21 on each side to receive pin 26 whereas drive roller supports 11 have only a hole to receive its pins 27. Consequently, drive roller 7 rotates on the axes of pins 27 in a fixed position while the axes of tension roller 8 at pins 26 are able to slide closer to, and further away, from drive roller 8. A tension roller spring 20 is attached to the tension roller pin 26 on each side of tension roller 8 thereby pulling the tension roller 8 away from the drive roller 7. This keeps an important tension on the belt 6 creating a flat upper belt surface **6*a* and a lower belt surface 6*b* as FIG. 6** shows.

In addition to keeping proper tension on the belt 6, the fact that tension roller 8 has a moving axis, kept in tension by spring 20, allows the tension roller 8 to adjust its position when the seam, if one exists, of the belt 6 comes in contact with either roller 7 or 8. Since a seam of the belt 6, where it is joined to create the loop, is by nature slightly thicker than the belt 6 itself, either because it is overlapped or because of adhesive or both, the circumference of the belt 6 momentarily becomes smaller as the seam passes around either of the rollers 7 or 8. Since the tension roller 8 can adjust its position, it momentarily moves slightly closer to drive roller 7 as the seam passes over a roller 7 or 8. This prevents any sudden tightening of the belt around the two rollers 7 and 8 that might result in excess torque demands on a motor-gearbox combination 25 that would freeze or bind revolution of the belt 6.

The rollers 7 and 8 have at each end flanges 18 that are slightly wider in diameter than the roller 7 and 8 itself and serve to keep the belt 6 from sliding off the rollers 7 and 8 and to prevent any side-to-side lateral movement of the belt 6. In this manifestation of the invention, the driver roller 7 has bands of rubber 98 at various points on the roller 7 to avoid slippage of belt 6 on the roller 7. It has been found that the bands of rubber 98 avoid the accumulation of static electricity that can otherwise build up on the underside of window 4 due to the contact and movement of the belt 6 across it to add resistance to the movement of the belt 6. Without the belt 6 installed, both drive roller 7 and tension roller 8 are able to spin freely and with low friction on the respective roller pins 26 and 27.

The spring-loaded tension roller 8 thus keeps proper tension on the shutter element belt 6 so that its upper surface **6*a* remains as flat as possible across the entire span from the top of drive roller 7 to the top of tension roller 8 and across its entire width from side to side. With this, the small distance between the top surface of shutter element belt 6 and the top surface of window 4 upon which coded image members (shown and described below) and other design articles are to be placed remains the same and constant across the entire work area 94. To this end, it is desirable that the upper surface 6***a* of belt 6 be in actual contact with the underside of window 4 across substantially the entire work area 94. In this way, the distance between the shutter elements 12 of the belt 6 and the upper surface of the window 4 upon which coded image members and other design elements are placed remains consistent whereby display and animation can be predictably controlled.

Figure 9:
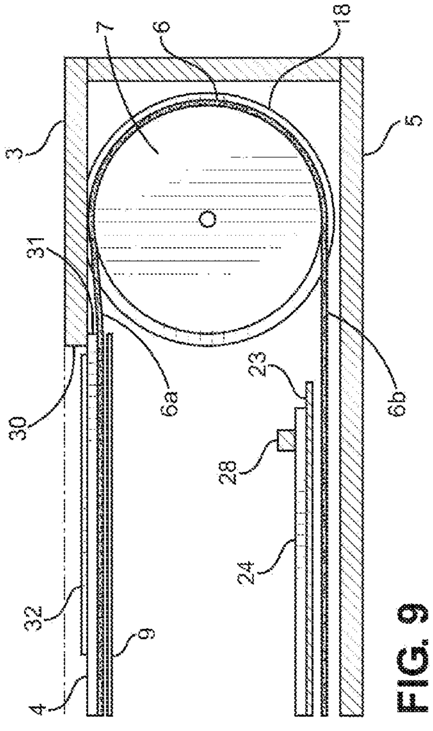
FIG. 9 is an amplified view in side elevation of a portion of an illuminated shutter element device according to the invention, again with a sidewall removed.

Turning to FIG. 9, which provides a cross-sectional side view of a portion of the device 1, a further understanding of the structure and movement of the belt 6 can be obtained, including the retaining of the belt 6 against and in even contact with the entire underside of window 4. The drive roller 7 could, for example, rotate in a counter-clockwise direction so that the shutter element belt 6 travels off the top of drive roller 7 and moves under the edge 31 of window 4 then to achieve a flat configuration across the underside of window 4. The lower surface of window 4 is lower than the top of drive roller 7 thereby promoting tension and contact. The lower surface of window 4 effectively presses down on the belt 6 contributing to the belt 6 being pulled tight. In cooperation with the force of the tension roller springs 20, the upper surface 6*a* of the belt 6 tends to be flat against the entire underside of window 4. FIG. 9 further shows a coded image member 32 laying on the top surface of window 4. As illustrated, a coded image member 32 resting on the top surface of the window 4 will be in a precisely parallel plane to, and equidistant from, the upper surface of shutter element belt 6.

Figure 10A:
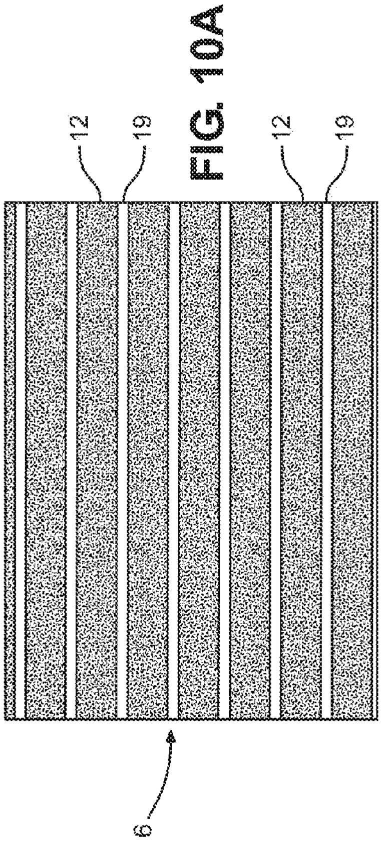
FIG. 10A is a top plan view of a portion of the shutter element belt disclosed herein.
Figure 10C:
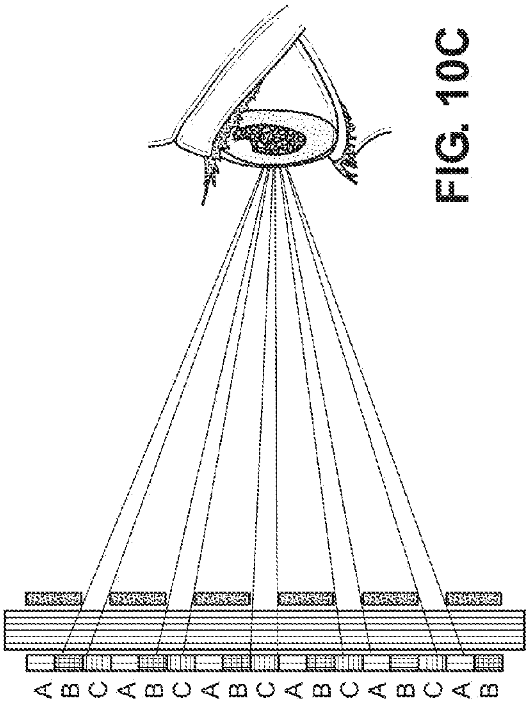
FIGS. 10B through 11B provide schematic views of coded image display and animation systems and a viewer's perception thereof.
Figure 10B:
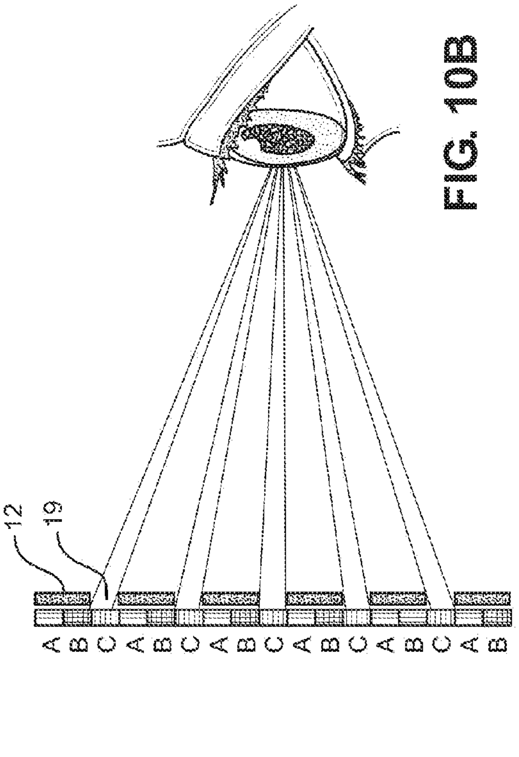

The design summarized above is advantageous in view of two key principles of coded image animation: parallax and pitch. FIG. 10A shows an amplified view of the shutter element belt 6 with shutter elements 12 alternating with adjacent viewing elements 19. In traditional barrier grid animation, both the shutter element layer and the coded image elements are held in full contact while one, either mechanically or by hand. Relative movement between the shutter element layer and the coded image elements orthogonal to the orientation of the shutter elements, viewing elements, and coded images creates the display and animation effect. In this traditional arrangement, there is no space between the two layers, and there is a natural and necessary unity of pitch between the two. FIG. 10B shows a traditional arrangement in which both shutter elements and picture elements are in full contact and in one-to-one pitch relationship. There, the eyes see the intended animation phase, which in this case comprises phase C.

Figure 11A:
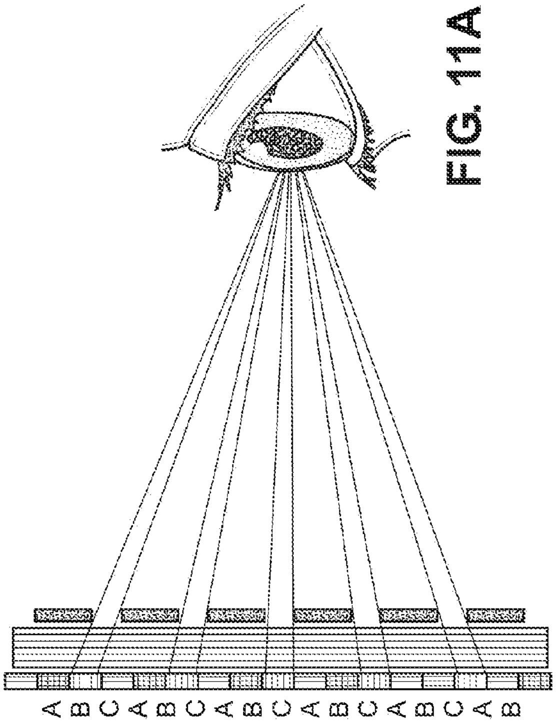

In a six-phase animation, the coded image member has a series of six image slices disposed in sequence. The shutter member has each shutter element equal in width to five of those slices with viewing element interposed between the shutter elements. In this arrangement, both elements are of the same pitch. This one-to-one pitch relationship between picture and shutter elements is essential to the optimal performance of all barrier grid or coded image animations. If the pitch of one element were larger or smaller than the other, the replacement of one animation phase with the next, rather than occurring at once, would instead wipe from one to the next, never presenting the eye with a coherent image at any one time, thus compromising the animation effect. It will also be noted that, in traditional barrier grid animation devices, because the shutter layer and the coded image layer are held in contact, the animation experienced is the same whether viewed from near or far and whether with two eyes or one. If they were separated even slightly by a distance of air or other clear material, the pitch of the two would appear to be different resulting in the perception of a non-cohesive, wiping, and unclear animated image. FIG. 10C shows two one-to-one pitch elements separated by a thickness of clear material. The eyes cannot see any one cohesive animation phase. Finally, FIG. 11A shows how the relationship of the two elements adjusted for proper viewing by enlarging the farthest element, in this case the coded image elements, to ensure that the eyes see the intended animation.

The present embodiment of the display device 1 differs from typical prior art devices in that the coded image member 32 and shutter elements 12 are, in this embodiment, separated by the thickness of window 4 such that the belt 6 can move without dragging the coded image members 32 with it. Here, the motor-driven shutter element belt 6 is positioned directly beneath and gently pressing up against the bottom surface of the work space window 4, and the user arranges and positions a variety of coded image members 32, which can be pre-printed on thin clear material such as acetate or vinyl, on the top surface of the window 4. It will be noted that embodiments of the invention, perhaps less preferable, are possible where no such separate exists, such as by having the belt 6 ride atop the window 4. However, it would then be necessary to provide some mechanism for restraining the coded image members 32 from traveling along with the belt 6.

Where the coded image members 32 and the shutter element member in the form of the belt 6 are separated as depicted, a one-to-one ratio of coded image pitch to shutter element pitch would produce a non-cohesive, wiping, and unclear image. To correct this and to insure a perceived one-to-one pitch ration between the two layers, the inventors have determined that the pitch of the shutter element 6 must be fractionally larger than that of the coded image elements 32.

Figure 11B:
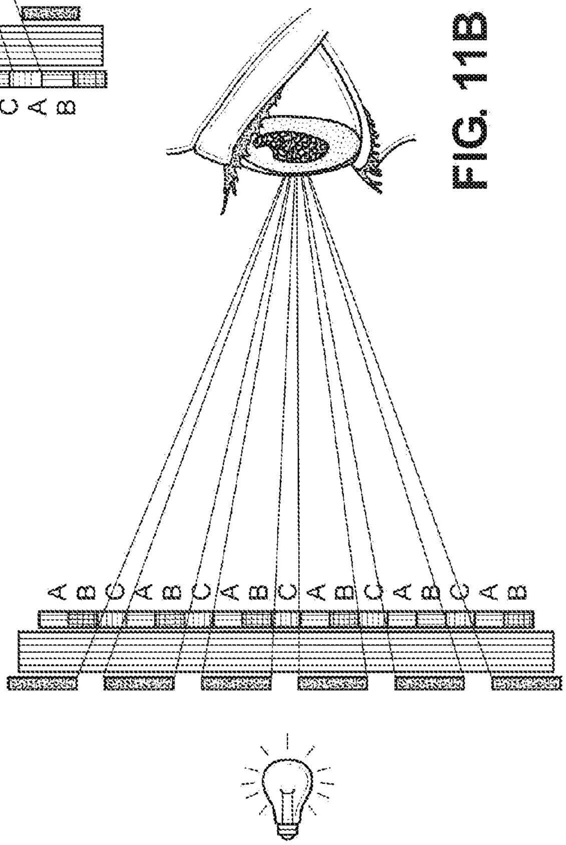

A schematic of visual perception under the present invention is depicted in FIG. 11B. There, the relationship has been corrected by enlarging the farthest element, in this case the shutter element so that the intended animation phase, again C in this depiction, is perceived clearly. For example, at a viewing distance of 15 to 20 inches, where the plurality of shutter elements are approximately 1/16 wide and with a 1/16 inch thick window separating the two elements, the inventors have determined that, to ensure a perceived one-to-one ratio, the pitch of the farthest element, the shutter element in this manifestation, must actually be 100.2% larger than that of the coded image slice.

The coded images, the shutter elements, and the viewing elements are preferably perceived in a horizontal orientation, traversing from the left to the right edges of the device 1. With this, each of the observer's eyes perceives essentially the same exact image at once. This is to be compared to the lack of clarity that would result if the elements were perceived vertically since each of the observer's eyes would simultaneously see a different image, with the right eye seeing around the right side of the spatially displaced images and the left eye seeing around the left side such that display and animation would be severely compromised.

Figure 12B:
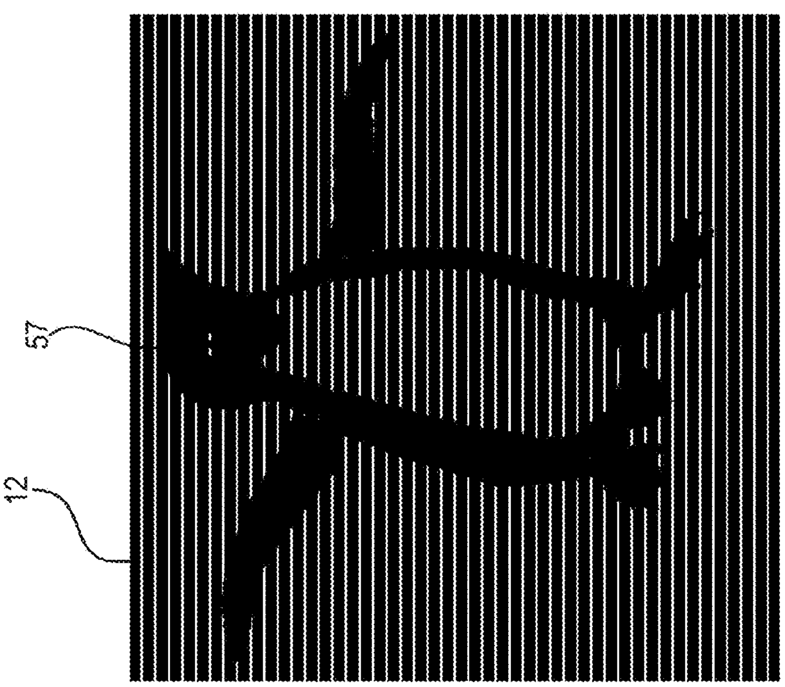
FIG. 12B is a top plan view of the coded image member of FIG. 12A in the process of animation by use of a shutter member.
Figure 12A:
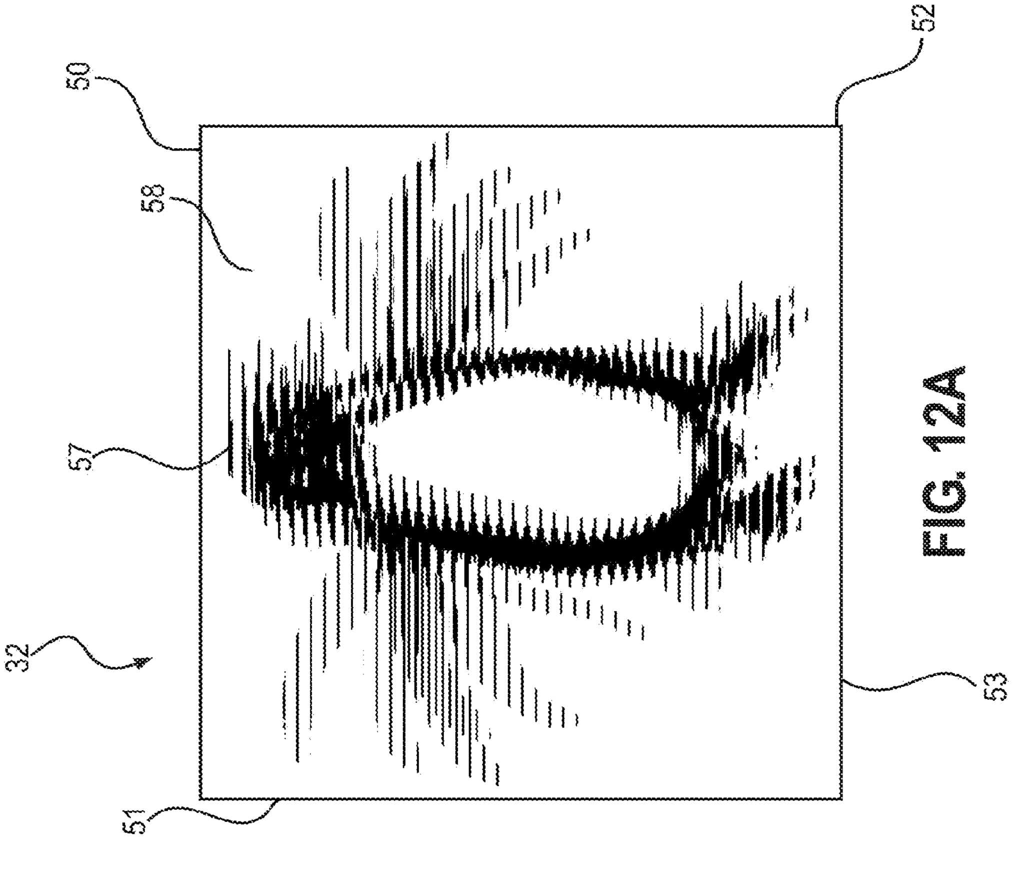
FIG. 12A is a top plan view of a coded image member.

FIG. 12A shows a sample coded image member 32 with coded image slices 57 applied to a clear substrate 58. The coded image member 32 is loose. It is not attached to the window 4 or the device 1 in general. The coded image member 32 and potentially multiple similar or different coded image members 32 can thus be selectively applied to, positioned, and removed from the display area, such as the window 4 of the device 1 or any other display screen with movable shutter elements 12 and interposed viewing elements 19. The substrate 38 can, for example, be crafted from thin, clear, printed plastic material, such as an acetate panel or film, but other materials will be readily obvious and are within the scope of the invention. If it is desired that the device 1 be used in a tilted or upright position, it may be desirable to impart an adherent quality to the coded image members 32. This could, for example, be done by adding a layer of repositionable adhesive to one side of the coded image members 32. It could also be accomplished by material selection, such as by forming the coded image members 32 from clear vinyl that when pressed to a smooth, non-porous surface, is adherent or demonstrates a high coefficient of friction. For most applications, it will be preferable that the substrate used for printing or mounting is as clear and transparent as possible, so that, when the subject piece is placed on the work area, only the animating or active coded images 57 will be seen, and the remaining area of the coded image member 32 will be virtually invisible.

For the coded image members 32 to have an optimum animation effect when viewed on the operational device 1, it is important that the user accurately align them with the corresponding shutter elements 12 and the interposed viewing elements 19 below. Specifically, the lines comprising the coded images 57 must be positioned to be as perfectly parallel to the shutter elements 12 as possible. Such alignment is a learned skill, but one that is soon acquired with use. To aid the novice user with alignment, the coded image members 32 could be pre-cut into rectangular shapes with right-angle corners and straight edges with the coded images 57 perfectly parallel to the bottom and top edges of the coded image member 32. As FIG. 12A shows, for example, the rectangular coded image member 32 can have opposing sides 51, 52 and 50, 53 parallel to each other. Of course, coded image members 32 can pursue infinitely different shapes within the scope of the invention except as it might be expressly limited, and merely having a single edge parallel to the coded image 57 may be sufficient to assist in alignment of the coded image member 32. The coded image member 32 is shown in proper alignment during display and animation by interaction with spaced shutter elements 12 in FIG. 12B. So disposed, the shutter elements 12 prevent light from passing through the inactive coded images 57 thereby effectively obscuring them while displaying and animating the sequentially active coded images 57.

During animation, all phases of a series of interlaced coded images 57 reveal themselves consecutively and in repeated series as movement is exacted in relation to a shutter member with spaced shutter elements 12. The resulting display and animation will depend on, among other things the design of the coded images 57 themselves and the relative speed of the shutter elements 12 in relation to the coded images 57. Here, the relative speed can be dictated, at least in part, by the speed at which the shutter element belt 6 moves in relation to the coded image members 32.

Animation cycles provided by interlaced coded images 57 can be designed to display and animate in animation cycles that are in loops or repetitive cycles so that images are sequentially related, potentially with the last coded image 57 cycling back to the first. For example, if six drawings are done of a clock face, with the hour hand progressing two hours in each drawing, a series of coded images 57 can be created by coding and interlacing Drawing One showing 12:00, Drawing Two showing 2:00, Drawing Three showing 4:00, and so on, until Drawing Six shows the hour hand at 10:00 thereby naturally leading back to Drawing One showing 12:00. In this coded image animation sequence, as the shutter elements 12 are drawn past the coded images 57, the hour hand will appear to swing round and round the clock face smoothly and continuously. The same animation technique can be applied to create the illusion of a continuously galloping horse or a continuously walking human figure.

But for the animation to convey verisimilitude, attention must be paid to the speed or cadence of the animated subjects, whether it be a galloping horse or a human figure walking. While judgment of speed is subjective, it may be fairly stated that to appear to possess realistic motion, one would expect to see the image of horse galloping at a life-like speed, such as approximately two to three full gallops per second, or for the image of a human being to appear to stroll at a normal gait, such as approximately two or three steps per second. Assuming that the interlaced coded images 57 provide one full cycle of drawings, such as a full gallop for a horse or a full step for a person, then the motorized belt 6 retaining the shutter elements 12 must be made to move at the appropriate speed. It has been found by the inventors that the belt 6 could thus move at such a rate that a single shutter element 12 in the array, in a one second period, traverses a distance that is somewhere between two and three times the width of the shutter element 12.

While there is no standard size or thickness for shutter elements 12, it is generally preferable to maximize the perceived resolution of the image by reducing the width of the shutter elements 12. The inventors have determined, for example, that a belt 6 with an array of shutter elements 12, each with an approximate 1⁄16 inch width, provides sufficient visual resolution while being within most acceptable and practical industrial printing and manufacturing tolerances. A belt 6 comprised of an array of 1⁄16 inch wide shutter elements 12 might, for example, be made to move at between 1⁄8 and 3⁄16 inches per second.

Similarly, a belt 6 with an array of extremely fine shutter elements 12, each with an approximate 1⁄32 inch width, for example, could be made to move at between 1⁄16 and 3⁄32 inches per second. While these tolerances may exceed the limits of some manufacturers, they are achievable with state of the art presses. The inventors have determined that the advantage of such fine shutter elements 12 is that, when they are viewed from a standard user distance of 15" to 20", they present themselves in total as a gray field, rather than as an array of separate elements 12, thus reducing or eliminating eye strain while increasing the perceived resolution of the created animations dramatically.

Under certain practices of the invention, the speed of the belt 6 could be predetermined and fixed. In other embodiments, the speed of the belt 6 could be adjustable, such as by permitting a selection from among predetermined settings and, additionally or alternatively, continuously over a given range. As taught herein, such adjustment could be enabled by the incorporation of a rheostat, a microprocessor, or another control mechanism that could be built into the device 1 to permit speed adjustment.

The drive train of the device 1 can be better understood with reference to FIG. 5. The drive roller 7 is rotated by motor and gearbox combination 25 through a motor pulley 17 rotating a timing pulley belt 95 that rotates a drive roller pulley 16 that is attached to roller pin 27. The motor-gearbox 25 in this embodiment can have a very high gear ratio, such as approximately 1000:1, which serves both to slow down the motor to the proper rotational speed and to increase the effective torque of the motor of the motor-gearbox 35. Rotation of the drive roller 7 rotates the belt 6 and the underlying tension roller 8. The motor-driven rollers 7 and 8 are designed to drive the shutter element belt 6 at a slow, steady, and continuous rate of speed.

In the present embodiment, the upper surface 6*a* of the belt 6 rotates so that the belt shutter elements 12 move from top to bottom with the shutter elements 12 rolling over the tension roller 8 and toward drive roller 7. Belt speed will be discussed in more detail below. It should be noted that the shaft of motor-gearbox 25 might, in another embodiment, be coupled directly to drive roller pin 27, eliminating the need for additional pulleys and a pulley belt. To minimize noise, this embodiment uses the timing belt to decouple the vibration of the motor-gearbox 25 from the rest of the device 1. Additionally, vibration has been further minimized by motor isolation foam 96. Power for the motor-gearbox 25 is provided either by internal batteries (not shown) and/or external wall power though an external adapter plug 97 as shown in FIG. 4.

While an electric motor of the motor-gearbox 25 is depicted, other non-electric methods of operation are possible and within the scope of this invention. By way of example and not limitation, the drive system could be manual, such as a manually operated crank or a flywheel, a portion of which could be exposed through the casing 5 of the device 1. The flywheel could be flicked or spun by hand, and it could have a weight sufficient to provide steady and continuous motion of the belt 6 until again actuated. Other exemplary embodiments could have a pull-string or a wind-up spring mechanism and gear train to rotate the drive roller 7 and the belt 6.

Referring again to FIG. 4, a circuit board 15 and switches 29 can optionally be included to permit control over operation of the device 1. Though steady, constant speed of the motor-gearbox 25 may typically be desirable, advantage could also be realized by permitting control over the speed and/or direction of the motor-gearbox 25, such as for special effects and variation. Numerous methods for accomplishing the foregoing would be possible. By way of example, this could be done with a microprocessor on a circuit board 15. Speeding up the motor-gearbox 25 would increase the speed of the animation of coded images 57, and reversing the direction of the motor-gearbox 25 would make the animations operate in reverse. Speeding up and/or changing direction could be done, for example, through switches under control of the user or programmatically using a microprocessor on the circuit board 15. Additionally, it might be desirable to turn off the motor-gearbox 25 while leaving the illumination source 28 illuminated. This would allow designs, whether coded images or not, to be arranged in the work area 94 while not animating, and then start them animating all at once when the motor-gearbox 25 is turned back on. This could have a pleasing surprise element in the creation of certain tableaus. Additionally, the microprocessor or another mechanism might be used to dynamically control the color of the illumination source 28, such as by use of RGB (red, green, blue) LEDs or other light sources to create lighting effects.

Referring to FIG. 6, an illumination source 28 is disposed to backlight the belt 6, such as by being disposed between drive roller 7 and tension roller 8 and between the upper surface 6*a* and lower surface 6*b* of shutter element belt 6. In the present embodiment, the illumination source 28 is formed by is a 3×3 grid of 9 LEDs mounted upon an illumination source frame 24 pointing upwards toward the underside of the belt 6 thereby providing a bright, even backlight when looking down upon work area 94 of window 4. An illumination source reflector 23 can be mounted to the illumination source frame 24 below the illumination source 28 to reflect any backwards cast or internally reflecting light back upwards in a further effort to disperse light evenly. The illumination source frame 24, including the LEDs 24 and the reflector 23, is suspended above the lower surface 6*b* of shutter element belt 6 by illumination source supports 22 located on each side of the lower surface 6*b* of belt 6. The lower surface 6*b* of belt 6 thus passes freely under the illumination source 28 and supporting frame 24 without touching or being impeded by it.

Figure 8:
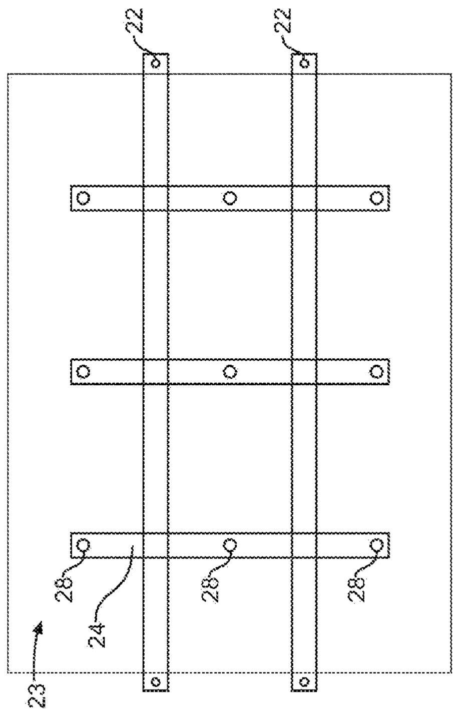
FIG. 8 is a schematic top plan view of the lighting configuration for an illuminated shutter element device as disclosed herein.

Looking to FIG. 8, one sees a configuration of LED illumination sources 28 on a frame 24 according to the invention. The LEDs 28 in this embodiment can have the widest possible angle of light throw to disperse light evenly without distracting hot spots across the underside of the upper surface 6*a* of belt 6. To aid in the even dispersal of light, a diffusion sheet 9 comprising a piece of thin, white, translucent material can be suspended above the illumination source 28 and just below, but not touching, shutter element belt 6 as shown in FIG. 9, for instance. It is held in position, and taut, at its four corners by mounts 14. Not only does diffusion sheet 9 soften and more evenly disperse light from illumination sources 28, but it also serves to create a white background in between the shutter elements 12 of belt 6 to enhance the display of color animation subjects and to prevent users from seeing into the interior of the device 1 between the belt shutter elements 12. Embodiments are also possible where the diffusion sheet 9 might be eliminated by printing the shutter elements 12 of belt 6 onto a white, translucent substrate rather than a clear, transparent one. In any case, it is estimated by the inventors that sufficient illumination of the spaces between shutter elements 12 of belt 6 may preferably be at least double the amount of ambient room light falling upon the device 1 itself.

It should be noted that other arrangements and positions of LEDs 28 and reflectors, as well as illumination sources 28 other than LEDs, might be used to provide sufficient backlight for display and animation and are within the scope of this invention. These include, but are not limited to, fluorescent light, incandescent light, light pipe plates, side illumination, and any other effective light source. Indeed, further embodiments of the animation and display system 1 might use still other typees of light, such as UV (ultraviolet) light, to create various effects. For instance, if the subject coded image members 32 were printed in UV fluorescent colors and UV (ultraviolet) back and/or side lighting were used, the animations would glow. Even natural daylight could be used as a backlighting source if the device 1 were fitted, for instance, with suction cups that permitted its adherence to a day-lit window.

Figure 13:
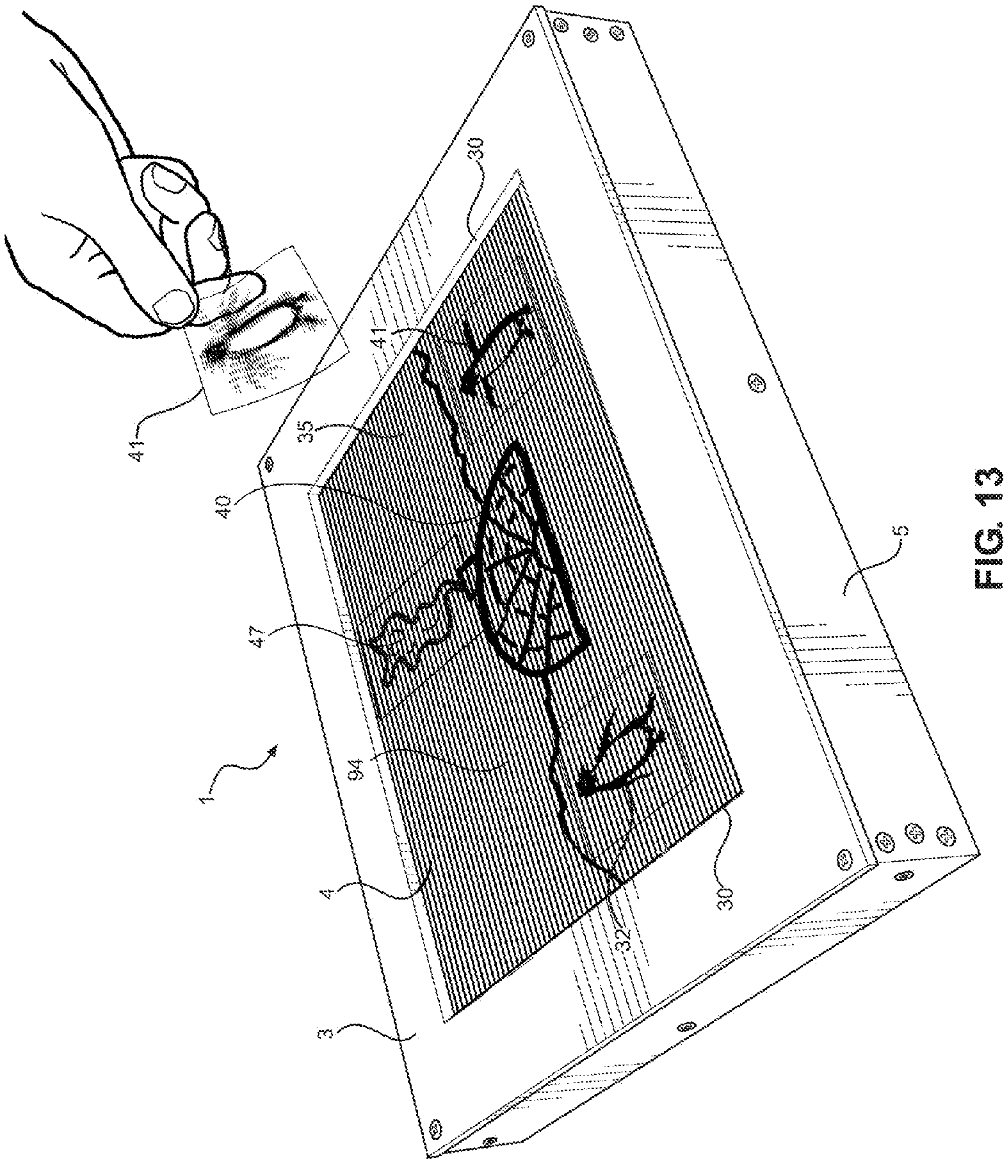
FIG. 13 is a perspective view of the illuminated shutter element device of FIG. 1 during use in a coded image display and animation system as taught herein.

Displays and animations could be created with multiple coded image members 32 and with background and foreground display elements that are devoid of coded image portions, that have localized coded image sections, and that have coded images over substantial portions thereof. For example, FIG. 13 shows a sample tableau that can be created with the animation and display system 1 that illustrates several key concepts of the invention. Partially animated background sheet 35 has been laid down first onto window 4 and covers the entire work area 94 inside window recess edge 30. On top of background sheet 35, three coded image members 32, 41, and 47 have been placed in different locations. In addition, areas are provided to permit freehand drawing 40 to be added, in this example in a central area of the background sheet 35. The upper portion of background sheet 35 depicts a sky with animated, coded image snowflakes falling through localized coded image portions, and a lower portion representing accumulated snow. With the two penguin coded image members 32 and 41, the freehand-drawn igloo 40 with animated smoke 47 through a localized coded image portion rising from its chimney, it can be seen that an engaging animating tableau, or movie, can be created with even just a few design elements.

The depicted background sheet 35 is a rectangle with parallel opposing edges disposed atright-angle corners and border dimensions matching those of the recessed work area 94. The background sheet 35 thus tends to square or align itself immediately when placed upon the window 4 so that coded image members 32 and coded images within the background sheet 35 are properly parallel with the moving shutter belt 6 beneath it. Background sheets 35 can be employed to fill large portions of the work area 94 or the entire work area 94 quickly and can cooperate to create a fully animated scene with the addition of just a few other design pieces. Since background sheets 35 are often used in conjunction with other display and animation members, including coded image members 32, the design and layout of animations of the background sheet 35 and the designs applied thereto can be light enough in saturation of color and or subject matter so that the shutter elements 12 of the belt 6 moving underneath will still serve the purpose to properly mask and reveal the loose coded image members 32 and other design elements placed upon it.

Figure 14:
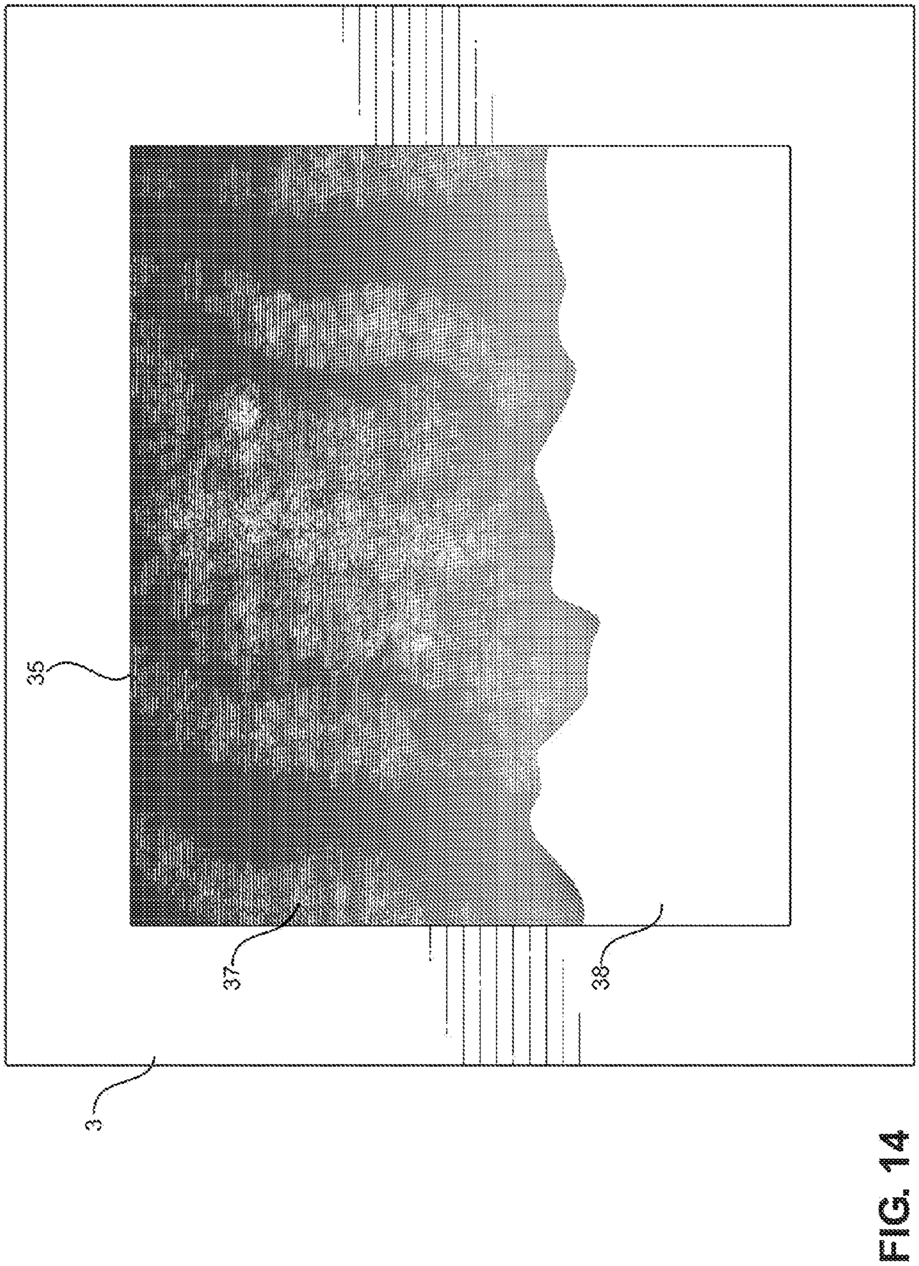
FIGS. 14 through 17 are top plan views of the coded image display and animation system in varying states of display and animation.

A partially animated background sheet 35 is depicted in FIG. 14. An upper portion 37 of the sheet 35 has localized coded image portions 37 that animate as snow falling against a light blue sky. The bottom portion 38 of the sheet 35 is devoid of coded images and is only transparently clear substrate of the sheet 35 such that it appears as the accumulation of white snow. Background sheets 35 could, of course, vary infinitely in design, including by having, for example, light, solid colors as non-animated portions upon which coded image members 32 and hand-drawn designs can be applied.

Figure 15:
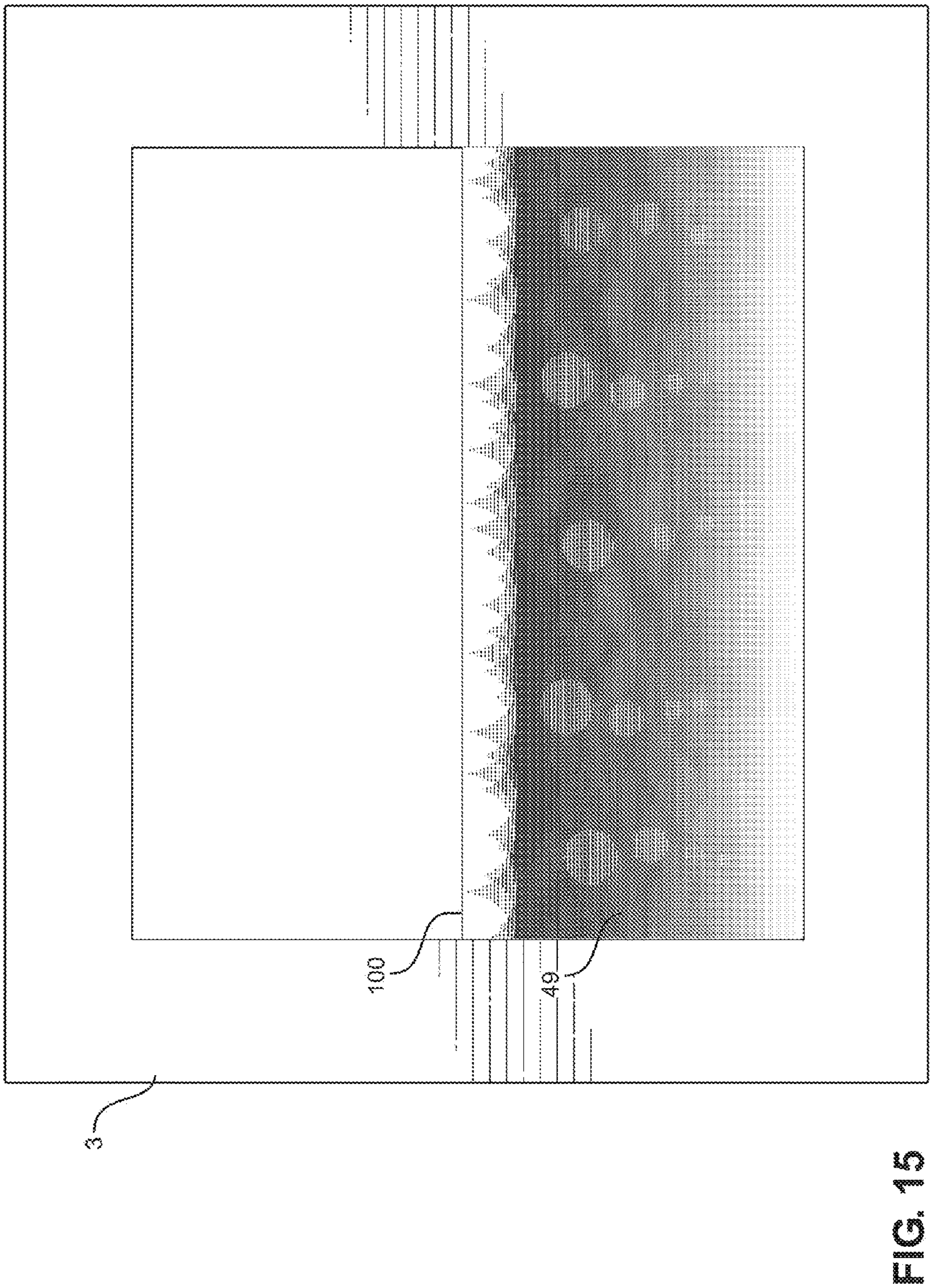

Smaller and differently shaped background sheets and, potentially, foreground sheets and members are readily possible within the scope of the invention. Without limitation, it will be understood that background sheets do not necessarily need to fill the entire work area. FIG. 15, for instance, shows a partial background sheet 49 in the form of a volume of water with moving waves and rising bubbles where the sheet 49 fills only roughly half the work area as shown by its upper edge 100. Even though partial background sheet 49 does not fill the entire work area 94 from top to bottom, it does have an aligned lower edge and it does fill the work area fully from side to side. With that, when the partial background sheet 49 is placed onto window 4 in recessed work area 94, its lower, right, and left sides orient the sheet 49 against recessed edges 30 such that the picture elements upon it are correctly parallel to, and aligned with, shutter elements 12 on the belt 6 moving therebeneath (not shown in FIG. 15). Such a partial background sheet 49 can be slid up and down within the work area 94 to create different visual designs while remaining correctly aligned.

Figure 16:
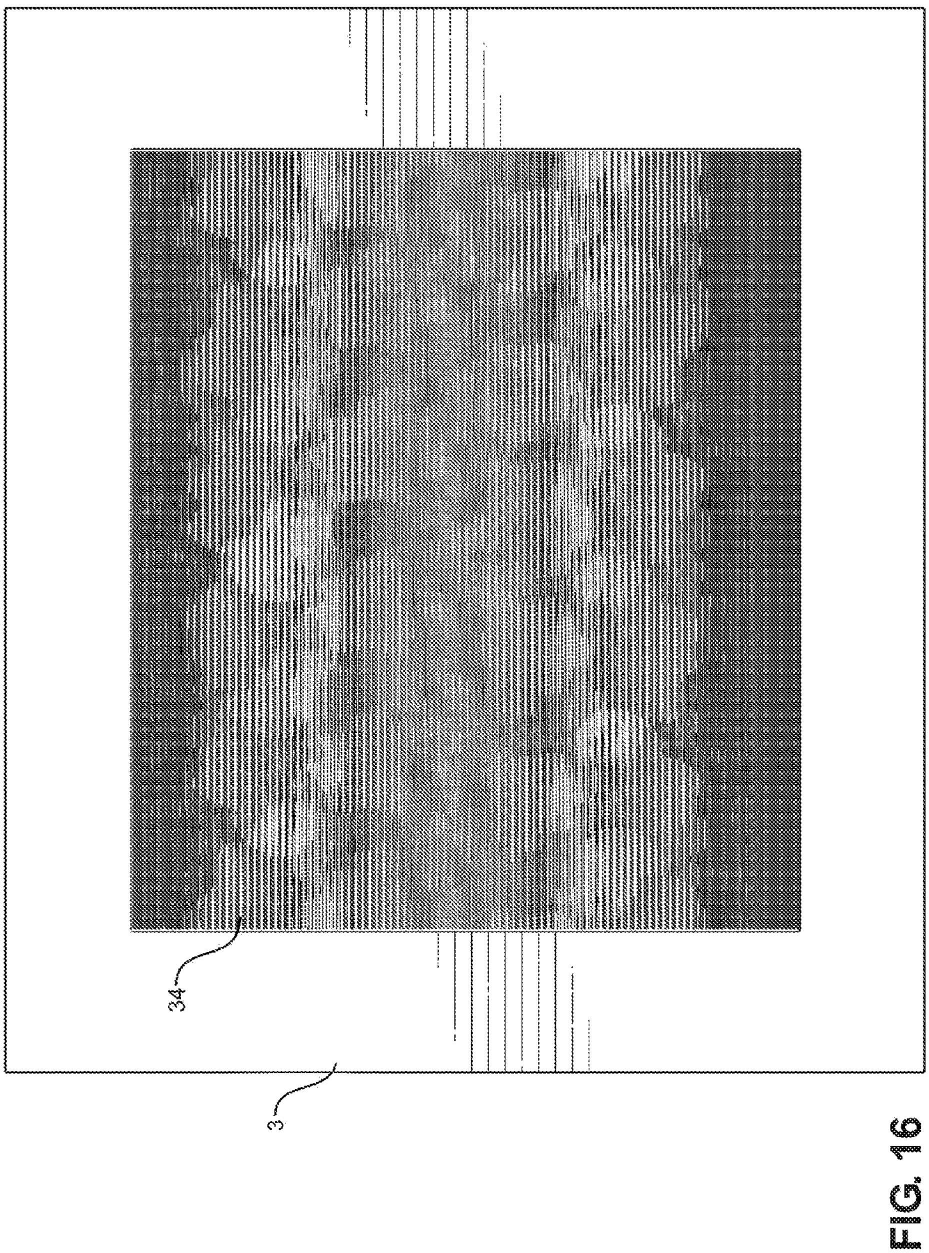

FIG. 16 shows another variation of background sheets in the form of a fully animated background sheet 34. Like partially animated sheets 35, the sheet 34 can fill the entire work area. Coded image animation can be applied over the entire or substantially the entire sheet 34. The depicted sheet 34 provides an animation of clouds moving across a blue sky. Here, the saturation of the blue sky and the transparency of the white passing clouds are light enough to allow for other coded image members 32 to be placed either upon it or underneath it while still animating correctly. Again, it is not necessary that background and other sheets 35 and the like be placed into the work area 94 first with coded image members 32 placed upon it. For instance, coded image members 32 can be placed first into the work area 94 with sheets 35 and others laid on top of the coded image member 32.

In whatever order they are applied, it is possible for coded image members 32 and sheets 35 and others to mutually adhere to one another. For example, where a background sheet 35 is placed first, coded image members 32 can be applied and adhered thereto, such as by being formed of an adherent substrate, by an adhesive, by material selection or activation, or some other mechanism. With this, multiple coded image members 32 and background sheets 35 and others can remain in a given configuration even when removed so that a given design tableau can effectively be saved simply by lifting the background sheet 35 out of the work area with the coded image members 32 adhered thereto. Additionally, any freehand drawings upon the background sheet 35 or the coded image members 32 will be saved as well. In fact, completely transparent background sheets 35, with no picture elements or color upon them, could be used to create a saved arrangement of coded image members 32 that are adhered to the background sheet 35. It is possible as well that multiple background sheets 35 and others could be used in overlapping or adjacent dispositions.

Figure 17:
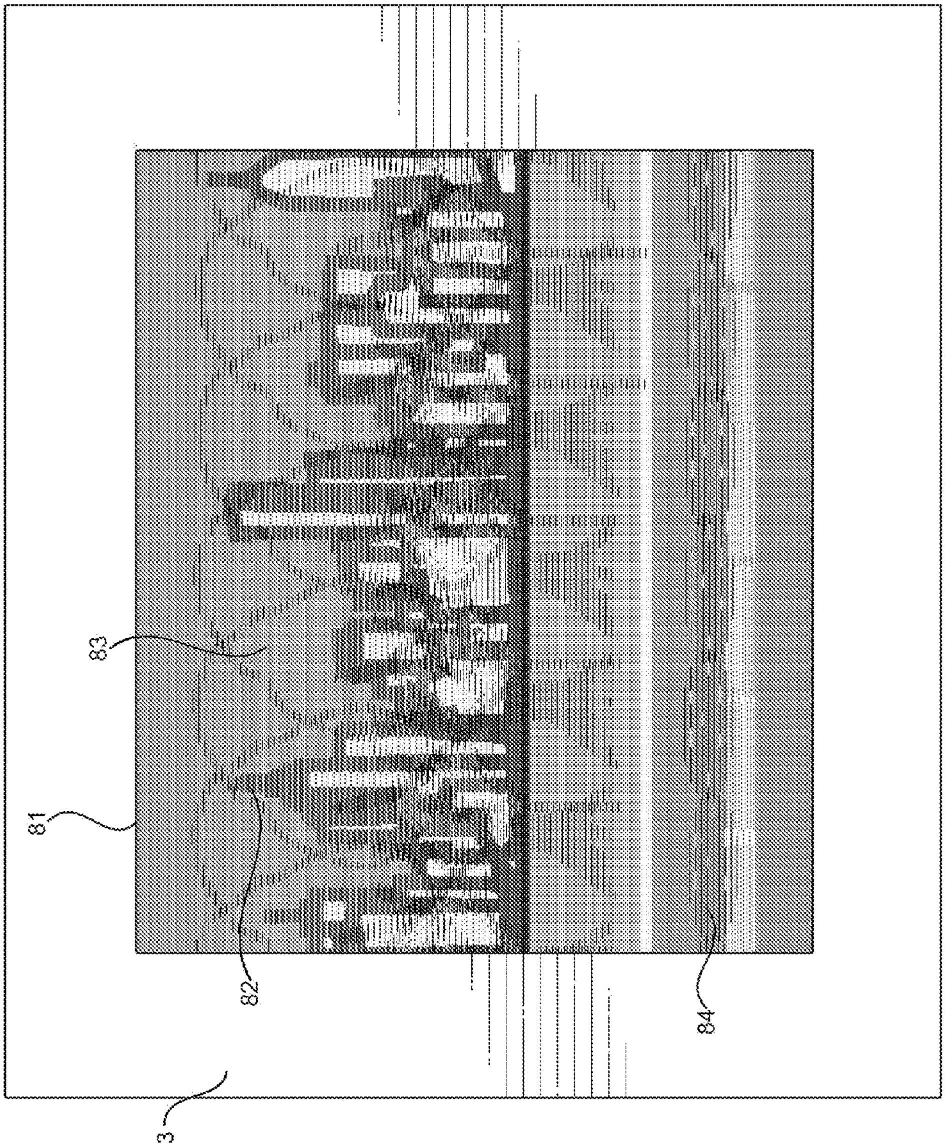

FIG. 17 provides an example of a mixed animation background sheet 81. This sheet 81 demonstrates how not all design elements on a given sheet 81 need be animated. The animated scene is of a cityscape. Here the skyline element 82 is a fixed, non-coded image portion that does not animate while the trees 83 and manholes 84 are formed by interlaced coded images to form coded image portions such that they appear to be moving in the same direction to create the effect of driving through a city. Coded image members 32, non-coded design members, and hand-drawn design elements can be applied over or under the background sheet 81.

Returning to FIG. 13, placed on top of background sheet 35 are three coded image members 32, 41 and 47. The coded image members 32 and 41 are both animated penguins that appear to waddle. Though the penguins are facing in different directions, the coded image members 32 and 41 are exact duplicate subject pieces disposed in reverse of one another. It will thus be appreciated that coded image members 32 and others can be flipped both horizontally and vertically while producing animation so long as the coded images are in alignment with the shutter elements 12 on the belt 6 below. While flipping a coded image member 32 about a longitudinal axis will produce the same order of animation, flipping a coded image member 32 about a latitudinal axis or upside-down will cause the animation phases to reverse.

In FIG. 13, both penguin coded image members 32 and 41 have been placed in work area 94 so that the respective side edges are touching window frame recess edges 30. By positioning the coded image members 32 and 41 with any of the four sides of the members 32 and 41 contacting any of the recessed edges 30 of the frame 4, the coded image members 32 and 41 are aligned with the shutter elements 12 of the belt 6. However, it is the intention of the invention that coded image members 32 and others can freely, and easily, be moved to any position in the work area 94 to quickly create a different tableau or design. For example, coded image member 47 is in the middle of work area 94, not touching any of recessed edges 30, and will animate correctly with proper alignment, which can present further educational and play value to the user.

In FIG. 13, the freehand drawing 40 and abstract coded image member 47 illustrate another aspect of the invention.

The freehand drawing 40 can, for example, be made using erasable drawing implements, such as dry-erase markers, so that the drawn image can be easily erased using, by way of example, a felt eraser or even a finger. The materials for the substrates and applied images for the coded image members 32, 41, and 47, and others the background sheets 35, 81, and others, and further members can be chosen to permit erasing of drawn images. A great many vinyl, acetate, and other plastic film types intended for the printing of coded image members 32, 41, and 47 and background sheets 35, 81, and others would work well for this purpose and are within the scope of the invention.

The freehand drawing 40 of the igloo in FIG. 13 is drawn directly on background sheet 35, and this drawing is used in tandem with the coded image member 47 to give the effect of smoke rising from the chimney of the igloo. It will thus be understood that freehand drawings can be combined with coded image members and background and foreground sheets to create a wide variety of effects and scenes.

Figure 18:
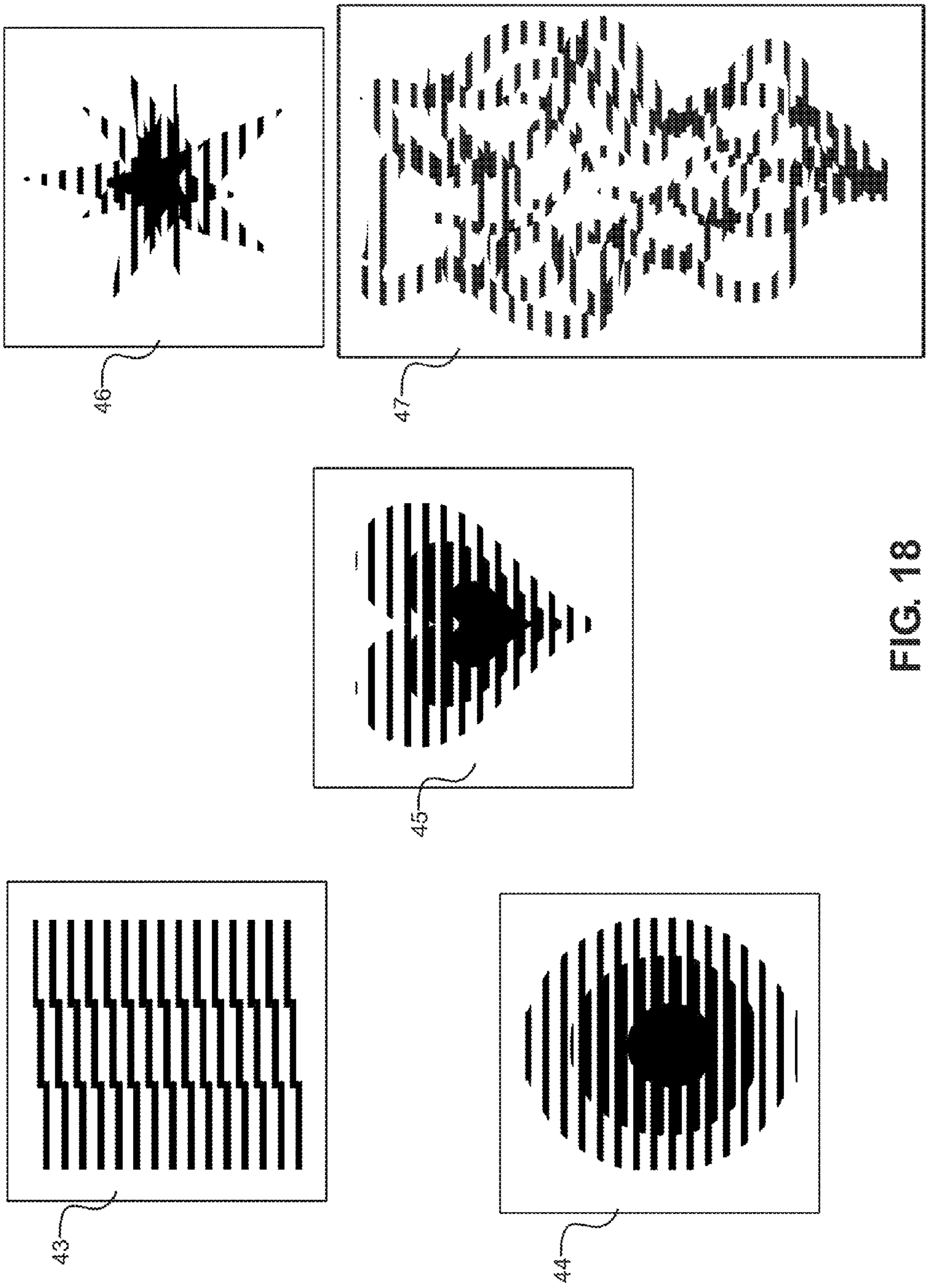
FIG. 18 provides top plan views of coded image members usable under the present invention.

Coded image member 47 also demonstrates that coded image members need not have picture elements that are restricted to definable, recognizable subject matter. As coded image member 47 is an animation of wisps of smoke rising, coded image members could be of changing patterns, colors, shapes, design and of any size. FIG. 18 depicts several of the infinite examples of this. Coded image member 47 depicts rising smoke as in FIG. 13. Coded image member 43 when animated appears to be three vertical lines moving in sequence from side to side. Coded image member 44 is a sequence of expanding yellow circles from small to large. Coded image member 45 is a sequence of expanding red hearts from small to large. Coded image member 46 is a star that appears to be twinkling when animated.

Figure 19:
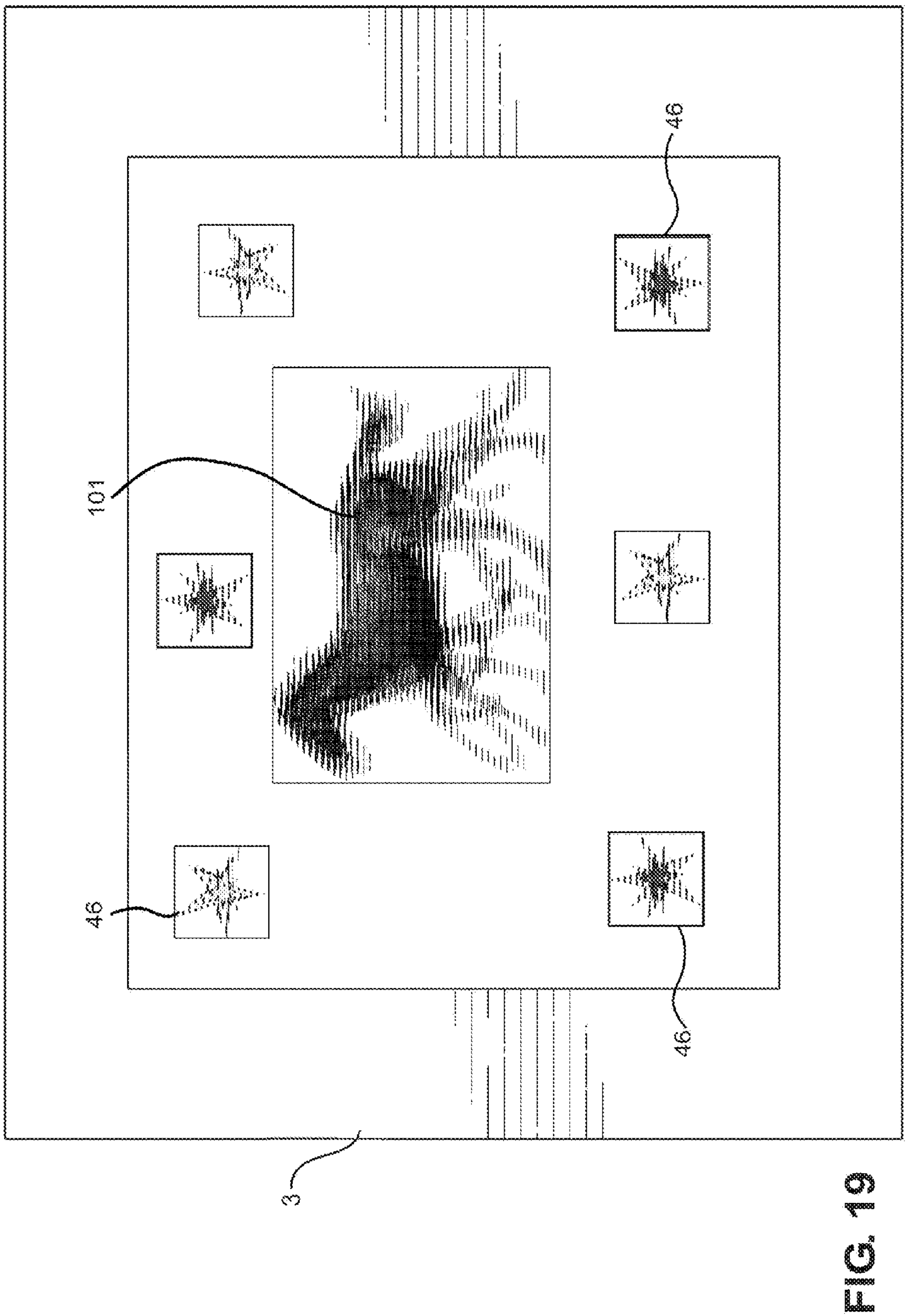
FIG. 19 is a top plan view of the coded image display and animation system during display and animation.

As mentioned earlier, coded image members can be flipped about lateral and longitudinal axes for different effects. For example, if coded image member 44 were flipped about a longitudinal axis, the animation would appear exactly the same. However, if coded image member 44 were flipped about a latitudinal axis, the circles would then appear to be contracting from large to small. In this way, coded image members can be flipped, moved and combined to create a wide variety of different effects and tableaus. For instance, FIG. 19 shows a coded image member 101 of a galloping horse surrounded by coded image members 46 of twinkling stars of different colors and in different orientations.

Figure 20:
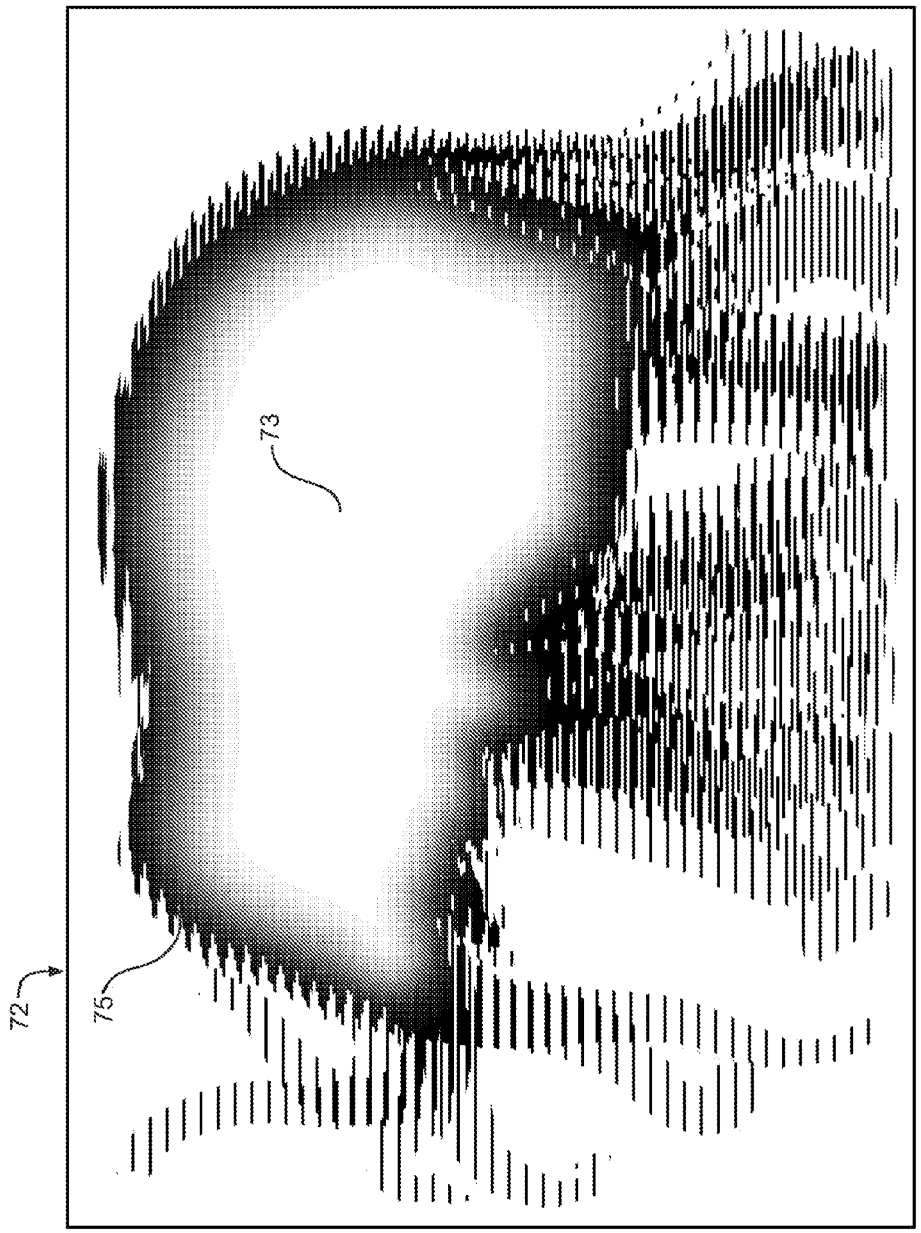
FIGS. 20, 21A, and 21B are top plan views of the coded image members with open display portions for user completion.

FIG. 20 introduces another concept of coded image animation as disclosed herein. In this example, coded image member 72 is an animated running elephant defined by coded image elements 75. With this coded image member 72, however, the center 73 of the elephant's body comprises an open area, such as by being left transparent or lightly colored. The user can thus fill or color in aspects of the subject. Where the ink is dry-erase, the inserted portions can be removed, replaced, supplemented, or otherwise changed. The display and animation system can thus become an animated coloring book where the user can color into and onto subject, including while animation occurs. Additionally, since the coded image member 72 itself contains the dry-erase ink that has been used to alter it, if the image member 72 is moved around the work area 94, then the alterations to the image member 72 move with the piece. It is further contemplated that entire background sheets might be provided that have several design elements, similar to the elephant coded image portions 72, with portions uncolored or otherwise open for coloring so that these can easily be colored in. With that, the user is presented with an animated coloring book where one colors in the animations even while they are moving.

Figure 21A:
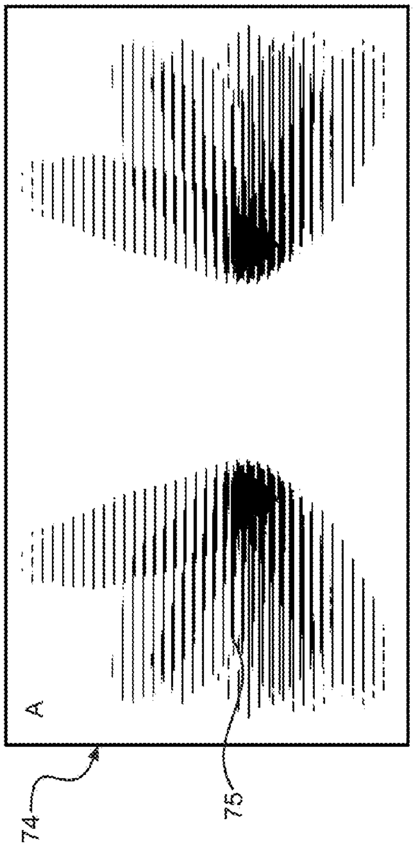
Figure 21B:
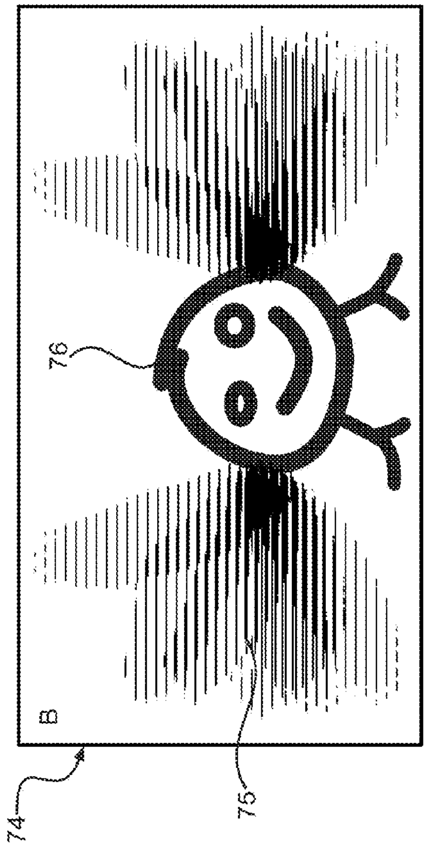

FIGS. 21A and 21B illustrate another concept of freehand drawing onto coded image members and demonstrates the broad design application possible under the invention. FIG. 21A shows a coded image member 74 with interlaced coded images 75 printed on it. The coded images 75, when animating, could be interpreted differently depending on the context in which they are used. The coded images 75 could be a bird's flapping wings with the bird body to be filled in by the user, a pair of moving eyebrows, a moving mustache, or any other design element possible under the user's imagination. FIG. 21B shows how, with the addition of a freehand drawing 76, the coded image 75 become a bird with flapping wings. Since the freehand drawing is on the coded image member 74 itself, the coded image member 74 becomes a flapping bird that can then be placed into any other tableau, and the bird's drawn body always accompanies the wings.

Figure 22:
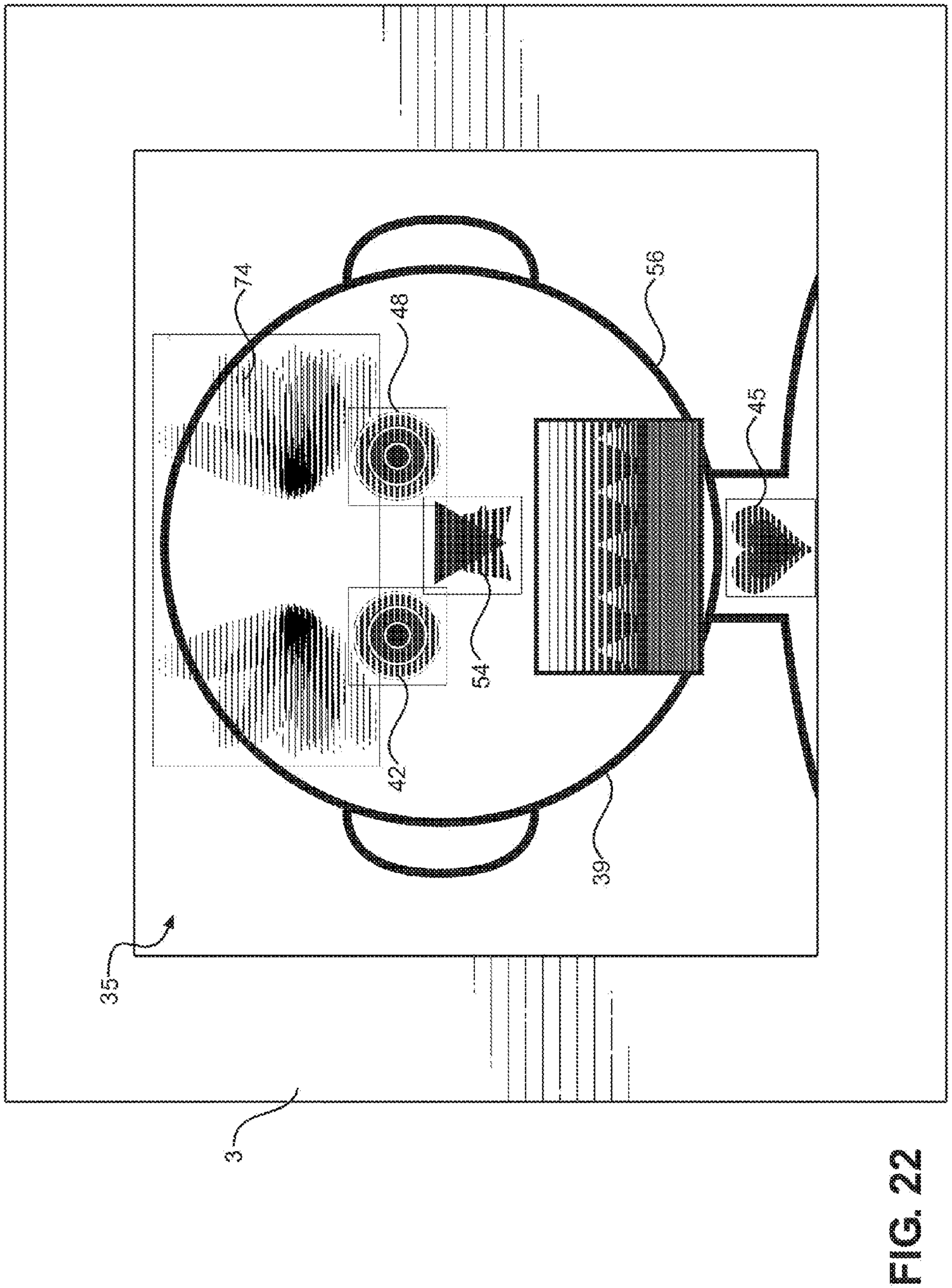
FIGS. 22 and 23 are top plan views of the coded image display and animation system during display and animation of user-created designs and tableaus, including by applying multiple images in combination to create complete characters from individual display components.

FIG. 22 shows the same coded image member 74 in a different context. Here, it has been placed onto background sheet 35. The background sheet 35 comprises a fixed, non-animated line drawing on a transparent clear sheet that fills the entire work area 94. The line drawing is just the outline of a person's face. The background sheet 35 is devoid of coded images and simply aids in the creation of a tableau or design. Here, a face outline with no features becomes a palette to mix and match various coded image members and, potentially, drawn portions to form a face. In this context, the coded image member 74 thus becomes funny moving eyebrows. Coded image members 42 and 48, expanding circles of color in the abstract, become eyes. Coded image member 54, a revolving triangle on its own, becomes a nose. Coded image member 56, an opening and closing set of teeth, become the mouth while coded image member 45 becomes a beating heart. Coded image members can be mixed and matched in innumerable ways to form different animating tableaus and designs.

Figure 23:
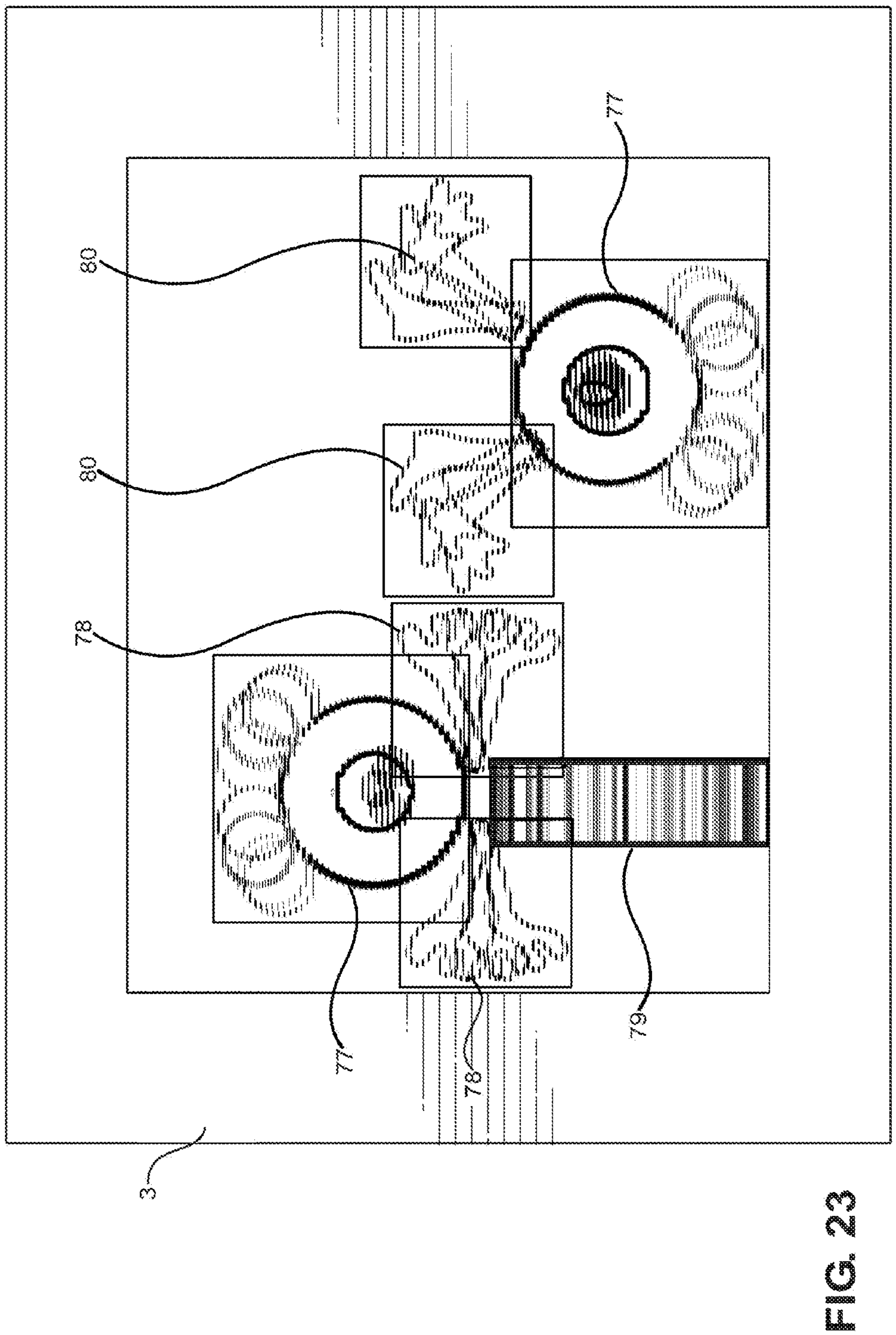

Turning further to FIG. 23, one sees coded image members combined in various ways to create different animating tableaus and designs. In FIG. 22, the coded image members can be spaced from each other and essentially used as individual elements of a larger design. FIG. 23 illustrates how coded image members can be adjoined in combination to form a larger animation and in effect a dynamically created new coded image member. Coded image members 77, 78, 79 and 80 are all cartoon-like animated images, some resembling body parts but some not necessarily. In the animation on the left, the coded image member 79 becomes a stick-like color changing body, while the coded image members 78 become waving arms and coded image member 77 a strange eyeball like head. Together, these four coded image members 77, 78, 79, and 80 form a single creature with a moving eye and waving arms. The subject on the right takes the same coded image member 77 and flips it upside-down so that it becomes a strange body with round moving feet and the two coded image members 80 becoming waving antennae. This again demonstrates how disparate coded image members can be adjoined to form an animated subject, and these composite subjects can be changed instantly by simply swapping out one piece and replacing with another. To carry this concept further, the pieces of each creature in FIG. 23 can be assembled onto background sheets 35, which could be large, small, separate, and perhaps completely transparent, so that they will remain as a unit if they are moved around the work area 94. Other methods can be used to keep coded image members adjoined within the scope of this invention. These include, but are not limited to, adhesive applied to the edges of each of the coded image members so that they would stick together, clear adhesive tape, magnets and/or magnetic edges, interlocking dye-cut perimeters to the coded image members similar to a jigsaw puzzle pieces, frames or other physical connectors, or any other coupling mechanism.

Figure 24:
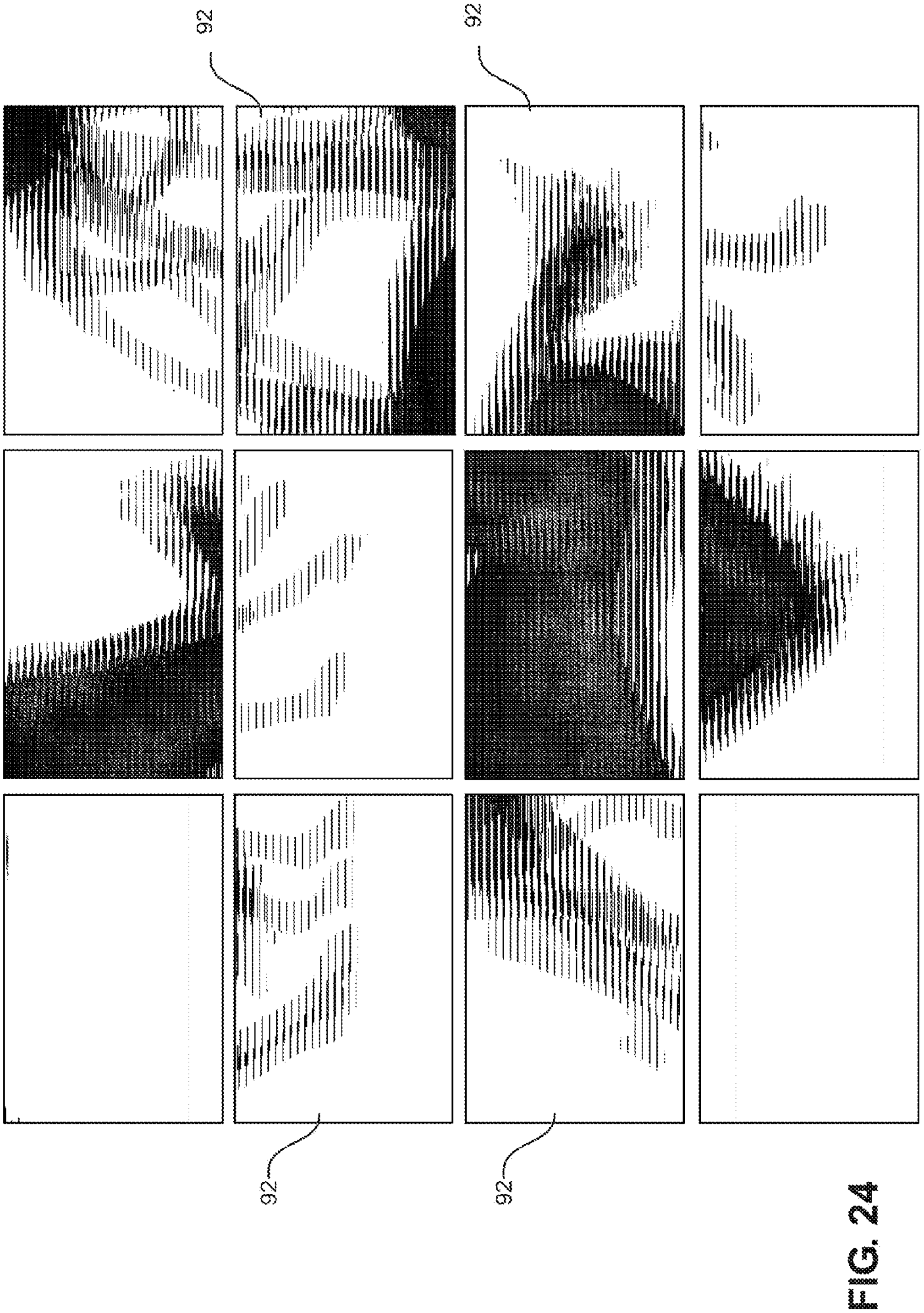
FIG. 24 is a top plan view of a coded image member puzzle pursuant to the invention.
Figure 25:
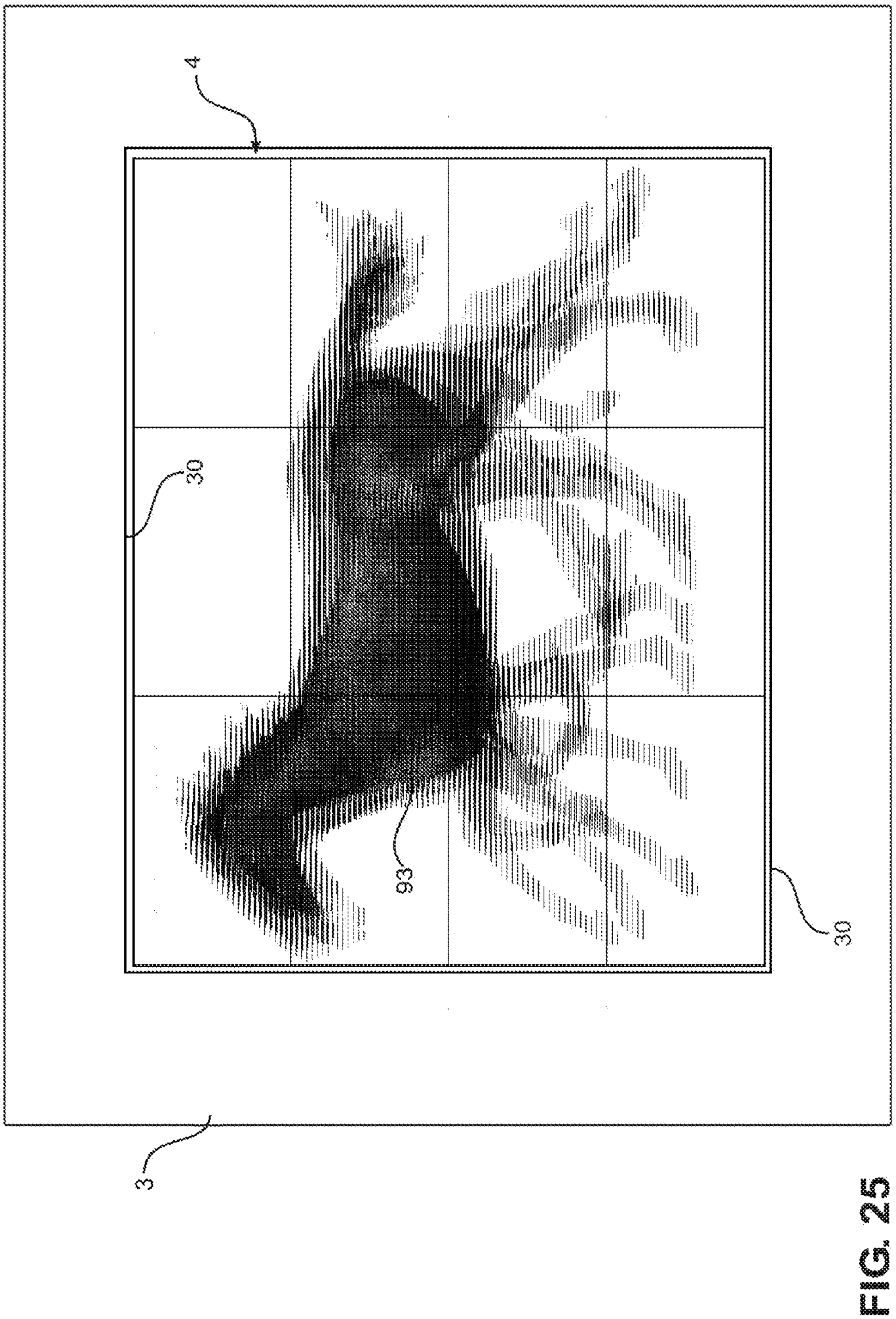
FIG. 25 is a top plan view of the coded image display and animation system with the coded image member puzzle of FIG. 24 correctly assembled for display and animation.

Turning to FIG. 24, one can perceive how the display and animation system could be used as a game device to create animated puzzles. Here, a single coded image of a horse galloping is cut into individual coded image members 92. As each coded image member 92 is placed upon window 4 in work area 94 as in FIG. 25, above the moving shutter element belt 6, it immediately springs to life. Each coded image member 92 is a portion of the entire image, but each coded image member 92 animates on its own. If the coded image members 92 are mixed up, flipped over, or rearranged as shown in FIG. 24, then it becomes the task of the user to assemble the pieces into a composite, single animating image. FIG. 25 shows the solved puzzle with the coded image members 92 properly arranged to reveal the single animating image 93.

In this example, the single image has been cut into 12 rectangular pieces of equal dimension, and the size of the composite image fits perfectly into the work area 94, but puzzle pieces can be of any size and even varying sizes, and it is not necessary for the pieces to even be rectangular, though it may be preferable. The smaller the pieces of the puzzle, the more difficult it will become to put together. A key to the puzzle can be provided, such as in the form of a static image, in this case of the horse running, to aid in solving the puzzle. Because the coded image members 92 in this example are rectangular, they not only each align perfectly to the shutter elements 12 of the belt 6 when placed against any of the window frame recess edges, but they also align with each other. This means that if one starts to solve the puzzle by starting at one or more of the window frame recessed edges 40, then disposing the pieces in edgewise contact will produce automatic alignment. It will thus be understood that coded image members can align adjacent coded image members if the user brings a coded image member into edgewise contact with a coded image member that is already in alignment.

Another variant of the puzzle in FIGS. 24 and 25 would be to mimic the classic game where a series of small squares are locked within a frame yet are able to be rearranged by sliding. A single empty square of the puzzle would thus be left open so that there is always room to move one piece into the empty slot so that others may be rearranged. The goal is to arrange all the pieces to form a composite, single image. The same might be accomplished hereunder, but with coded image animation. The coded image members could have the same interlocking tongue and groove design as the classic game. The individual coded image members would be locked into a frame and able to slide in relation to each other without falling out of the frame. The frame can be set into and can fill the work area 94. The individual coded image members, just as shown in FIG. 25, would animate as they are slid around for the puzzle to be solved.

Figure 26:
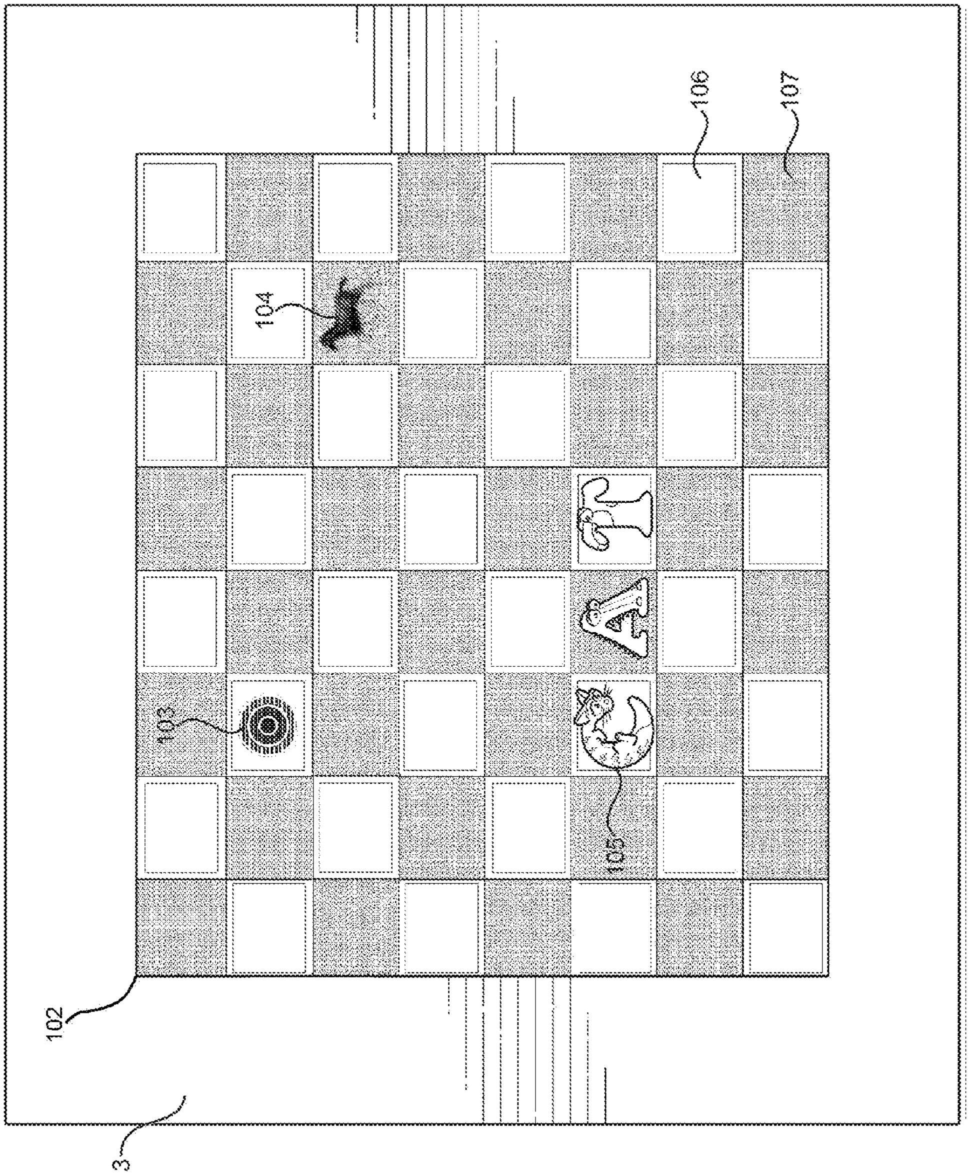
FIG. 26 is a top plan view of the coded image display and animation system with a game display applied thereto with image members and coded image members applied to the game display.

Other interactive games are possible with the present display and animation system. For example, FIG. 26 shows a background sheet 102 that has been placed onto window 4 and fills the entire work area 94. This sheet 102 is a grid of squares similar to that used in board games, such as checker, chess, the board game sold under the registered trademark SCRABBLE by Hasbro, Inc. of Pawtucket, R.I., and others. In this example, the white squares 106 are transparent parts of the background sheet 102, and gray squares 107 are slightly colored. The color of the squares 107 or other such design elements for other games will preferably not be too dark or saturated in color since they need to permit the shuttering effect of shutter members 12 for proper animation. Alternatively, the background sheet 102 could take the form of a dimensional tray of squares formed with slightly embossed or raised borders around each square 106 and 107 thereby effectively making each square 106 and 107 a slightly recessed well. This would not only serve to align the loose coded image members 103 automatically with respect to the shutter elements 12 on the belt 6 as they are placed into the recessed wells of each square 106 and 107, but it would also retain the properly aligned position of each coded image member 103 as other coded image members 103 are added. Coded image member 103 shows an animated circle of color that might be a checker piece in a checker game. Coded image member 104 shows a running horse that might be a knight piece in a chess game. Other pieces could similarly have specific identities as king, queen, and others to be animated in equally exciting ways. The three coded image members 105 show an example of an animated word game, such as the board game sold under the registered trademark SCRABBLE, and how each letter could be animated, potentially as a character or design. Other games and puzzles can be adapted to utilize this animation aspect of the display and animation system.

Figure 27A:
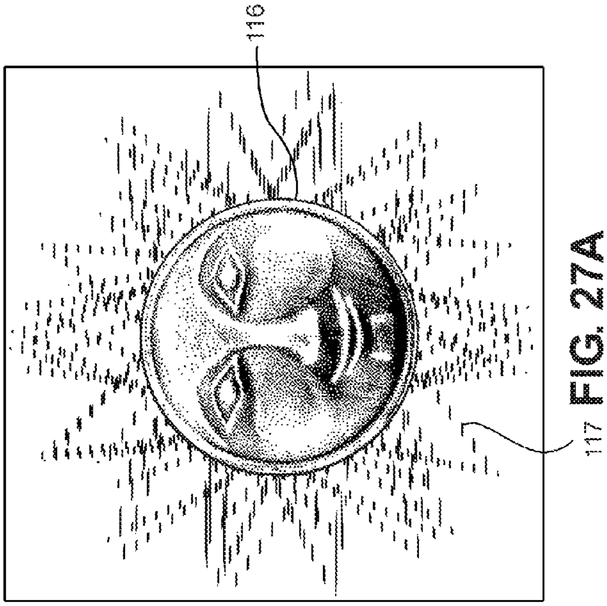
FIG. 27A through 27C are views of three-dimensional image members for use under the present invention.
Figure 27B:
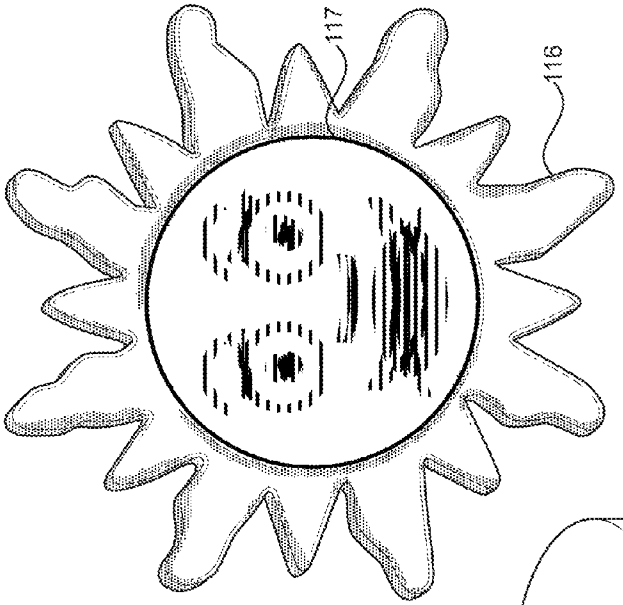
Figure 27C:
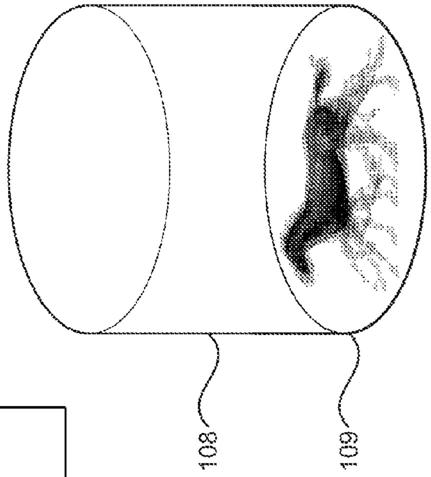

FIG. 27 illustrates how certain coded image members might not be flat while permitting animation of the coded image members' image element. As an example, FIG. 27C shows a three-dimensional coded image member 108 as a cylinder of transparent material, such as plastic, that has mounted on its bottom surface a coded image 109, in this case a galloping horse. The volume of the coded image member 108 above the image 109 can be transparent so that the image 109 can animate and the animating image can be seen through the clear material. The upper transparent volume could be shaped or contoured, such as in the shape of a chess piece knight, so the piece could be used in a game of chess as described in FIG. 26 along with other similarly animating pieces. The volume of material above the animating image 109 makes the piece easily graspable. The coded image member 108 need not be round in shape, but the volume above the animating image 109 will preferably be transparent enough to view the animating image 109. FIG. 27A shows a coded image member where a coded image portion 117 surrounds a non-animating center portion 116. The center 116 in this example is made of a quilted fabric material while the surrounding coded image portion 117 is printed as are other subject piece animations. FIG. 27B shows a coded image member with a center coded image portion 117 and a non-animating surrounding portion 116. The use of mixed materials adds a fun, tactile dimension and demonstrates other forms of animating coded image members that are possible.

Figure 28:
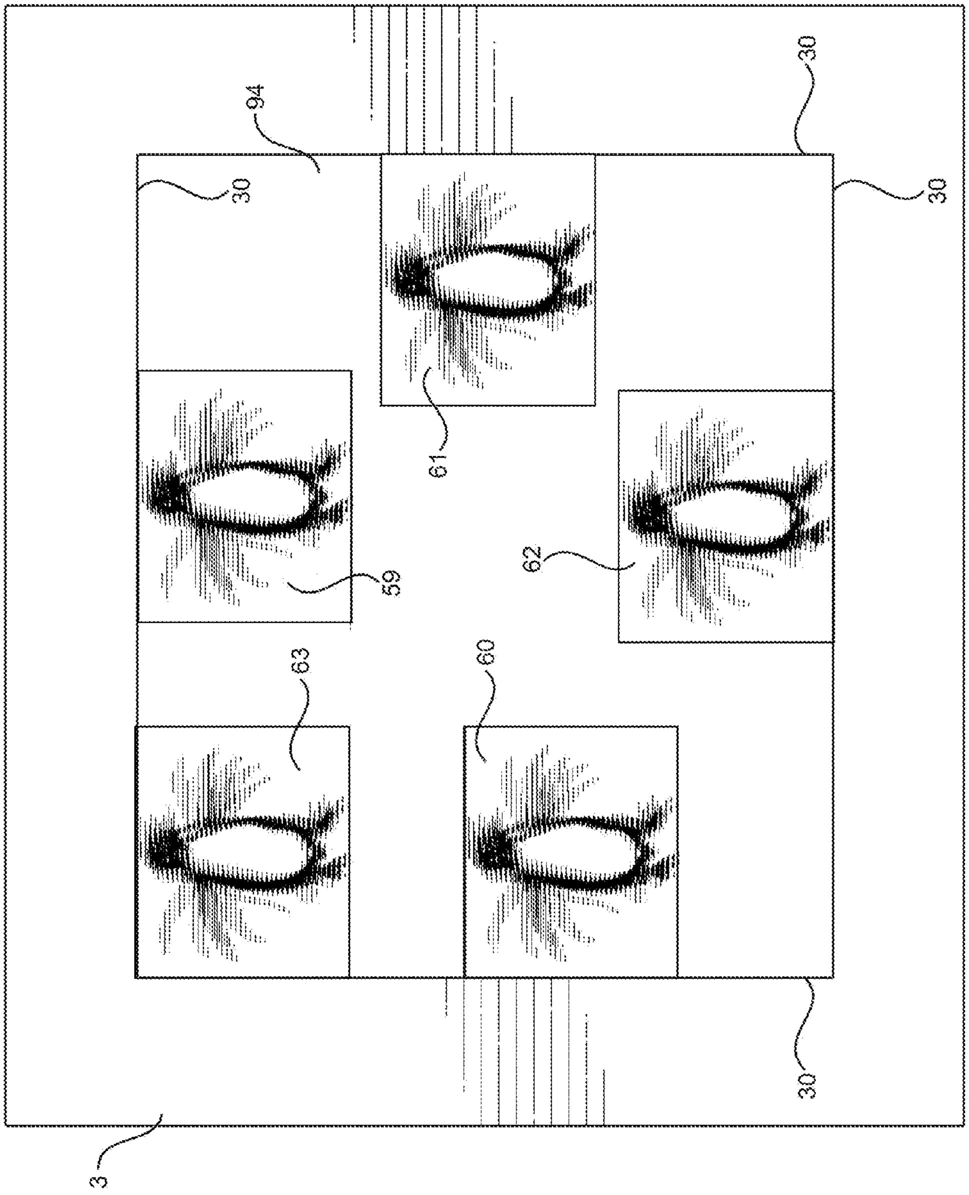
FIGS. 28 through 31 are top plan views of the coded image display and animation system during display and animation of further user-created design combinations.

FIG. 28 illustrates how the four inner recessed edges 30 of window frame 3 forming rectangular work area 94 aid in the easy alignment of coded image members that are placed in direct or derivative contact with any of the edges 30. As stated previously, for proper animation of the images to occur, it is necessary that coded image members be aligned properly so that the lines comprising the coded images of the coded image members are parallel to the shutter elements 12 of belt 6. With coded images printed on substrates having aligned edges with the coded images parallel to the top and bottom edges of the coded image members and perpendicular to the side edges, a rectangular coded image member placed against any of the edges 30 will be properly aligned relative to the overall device 1. Each of the five coded image members 59, 60, 61, 62, 63 in FIG. 28 shown are therefore aligned properly, and this was accomplished easily by simply sliding them to adjoin one of the edges 30. However, when the coded image members are moved away from recessed edges into the center of work area 94, alignment is not automatic and must be carried out by the user.

Figure 29:
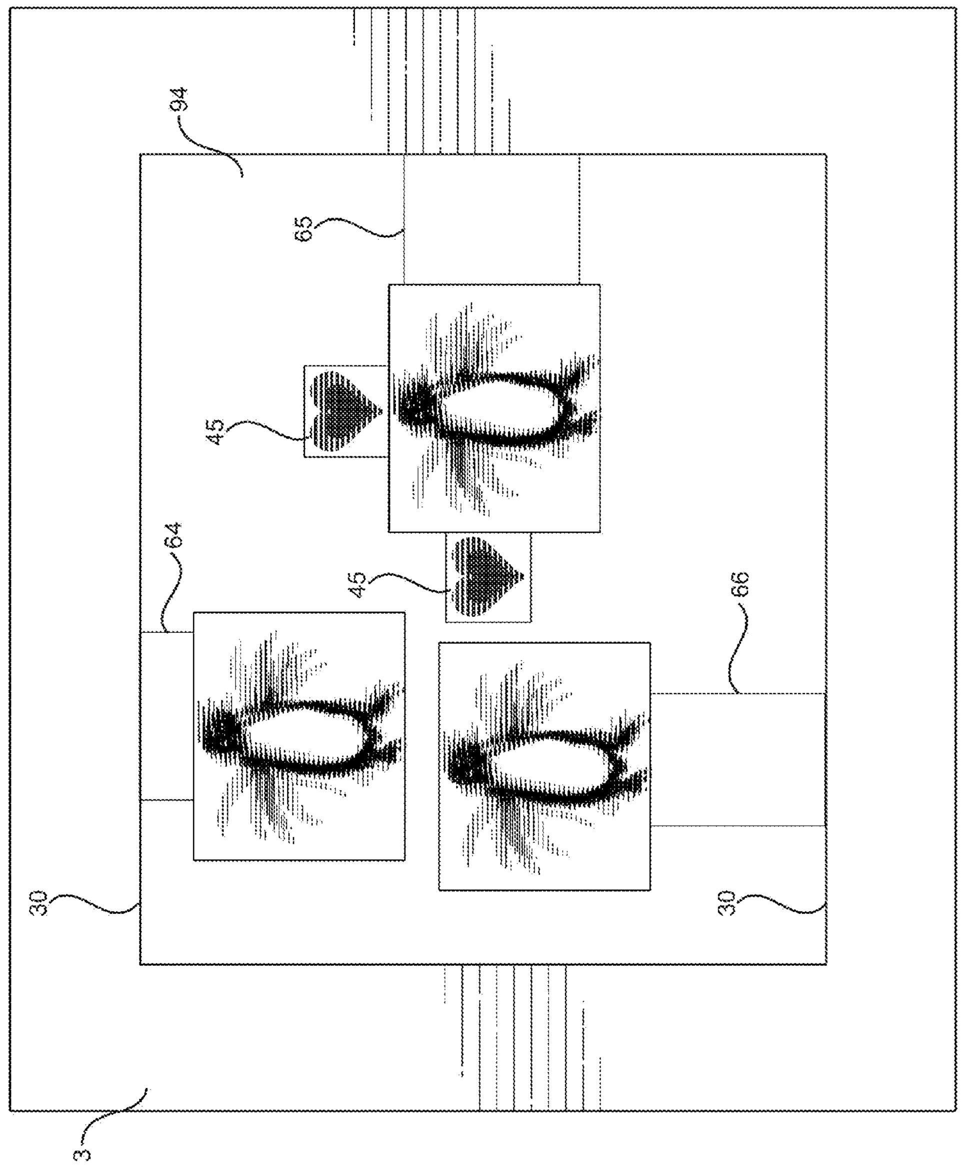

As shown in FIG. 29, to assist in the easy alignment of coded image members placed away from the edges 30 of window frame 3, transparent spacers such as spacers 64, 65, and 66 could be used. The spacers 64, 65, and 66 can be founded on the same material as the coded image members, but they can be completely transparent with no images. The spacers 64, 65, and 66 can be rectangular in shape, and a variety of sizes can be provided. Since the spacers 64, 65, and 66 are rectangular, one spacer 64, 65, or 66 can be rotated to provide varying widths. By placing a spacer 64, 65, or 66 against any of the window frame recess edges 30 as shown and then placing a subject adjoining to the spacer 64, 65, or 66, the coded image member is quickly and properly aligned. Since spacers 64, 65, and 66 are transparent, they are virtually invisible and will not affect the visual design of the animating tableau. Additionally, coded image members that are already properly aligned can be used to align other subject pieces in a practice that can be referred to as stacking. For instance, in FIG. 29, the two heart coded image members 45 are adjoined to one of the penguin coded image members so both heart pieces are properly aligned. In this way, pieces may be stacked away from any of the recessed edges 30 with all pieces easily and properly aligned.

Figure 30:
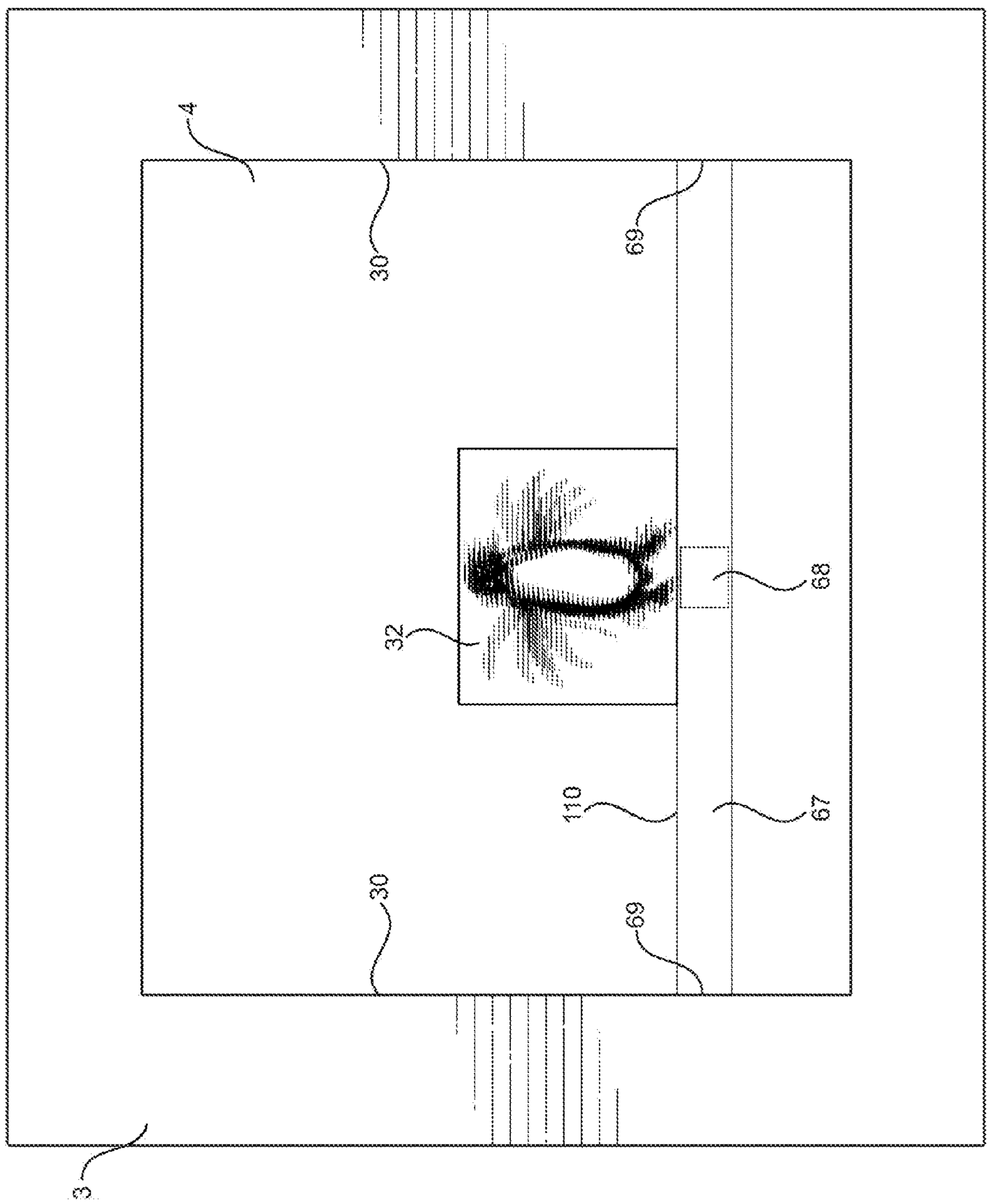

FIG. 30 shows a simple tool that might be used to aid in alignment in the form of a transparent alignment strip 67 comprising a piece of transparent plastic with a handle 68. The width of the strip 67 can match the width of the window frame 3, and opposing edges 69 of the strip 67 are parallel to the longitudinal edges 30 of the window frame 3 so the strip can be placed upon window 4 to have its upper edge 110 is parallel to the bottom recessed edge 30 of window frame 3. Therefore, any coded image member, such as the coded image member 32 shown, that is adjoined to the upper edge of the strip 67 will be automatically aligned for proper animation. By use of the handle 68, the strip 67 can be easily lifted and moved without disturbing coded image members already positioned. Moreover, coded image members can be placed at various points in the work area and be properly aligned. Such a tool could alternately be built in to the device 1 and potentially guided by tracks or even hinged so that one end could be lifted up during the changing of its position so as not to disturb coded image members already placed.

Figure 31:
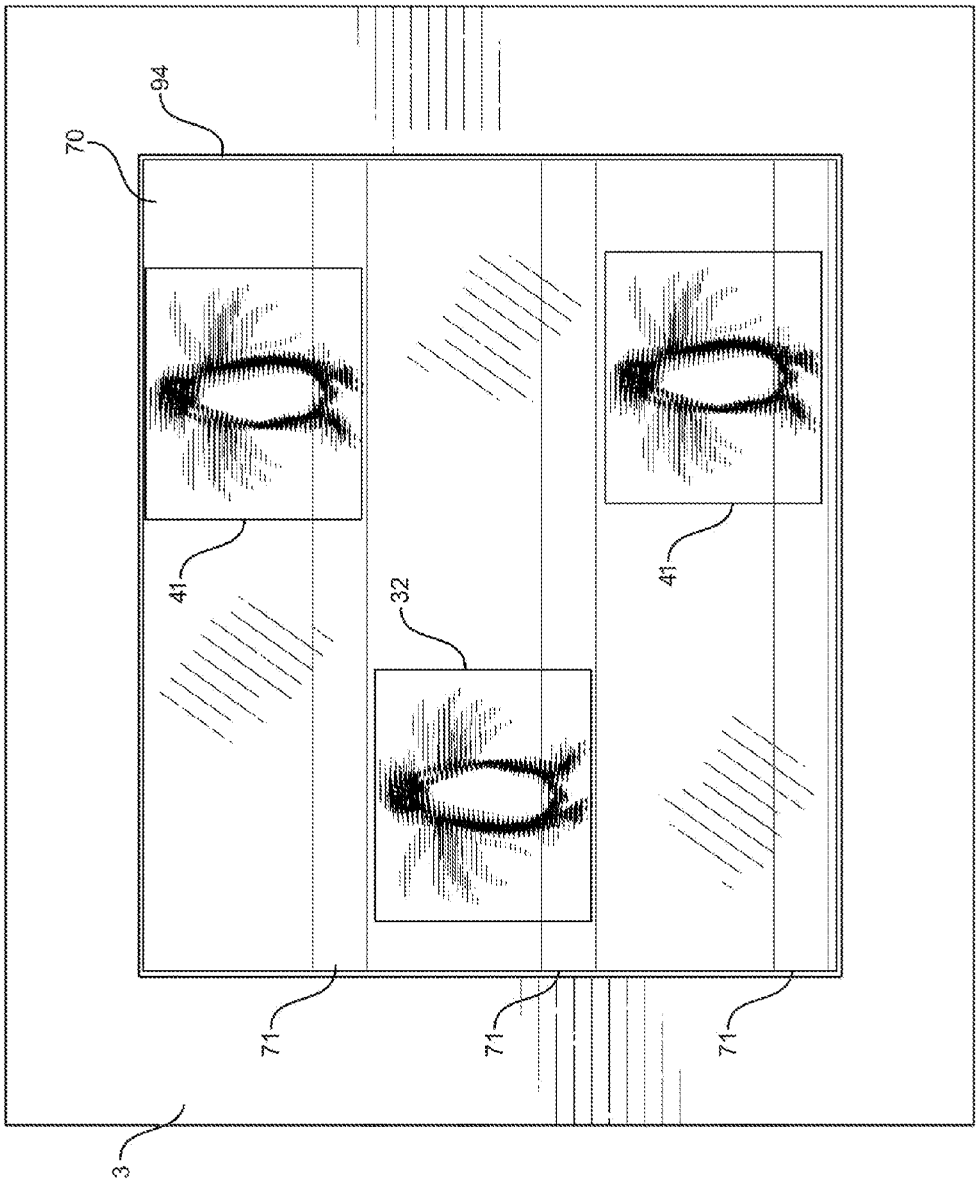

Looking to FIG. 31, one sees another mechanism by which coded image members might be easily and properly aligned. There, an alignment sheet 70 is a transparent sheet of acetate or other material that can cover all of work area 94. At various locations on sheet 70 are horizontal pockets 71 that run the width of the sheet 70 from side to side. The horizontal pockets 71 are parallel to the bottom edge of work area 94. With that, any coded image members, such as those indicated at 32 and 41, can be placed into the pockets 71 and will automatically be properly aligned for animation. Since the sheet 70 is transparent, it is virtually invisible when placed upon the illuminated window 4, and only the animating images of the coded image members 32 placed into the pockets 71 will be visible.

Figure 32C:
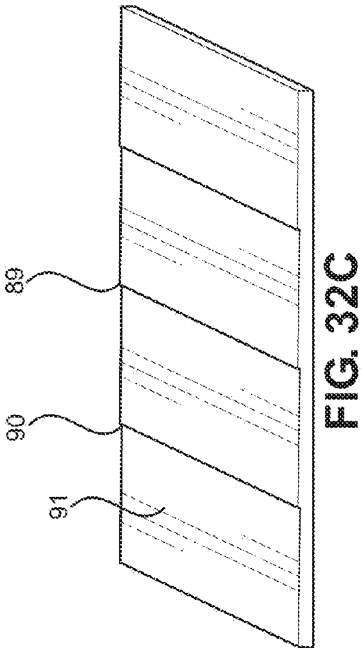
FIGS. 32A through 32D are perspective and side elevational views of alignment configurations for coded image displays and animation systems as taught herein.
Figure 32B:
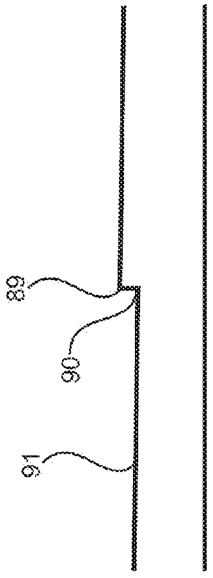
Figure 32A:
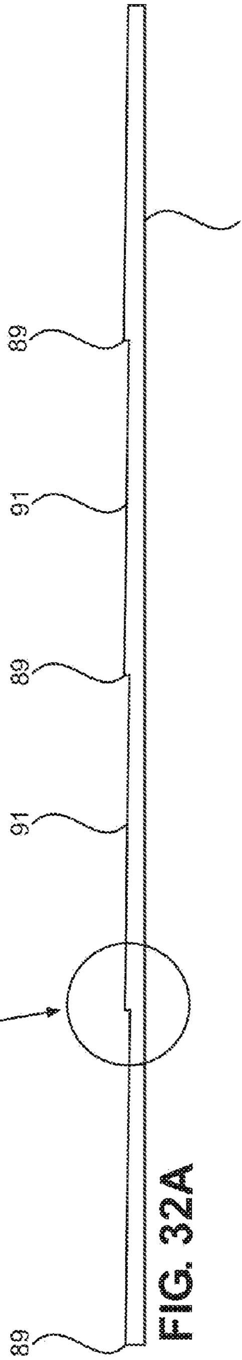
Figure 32D:
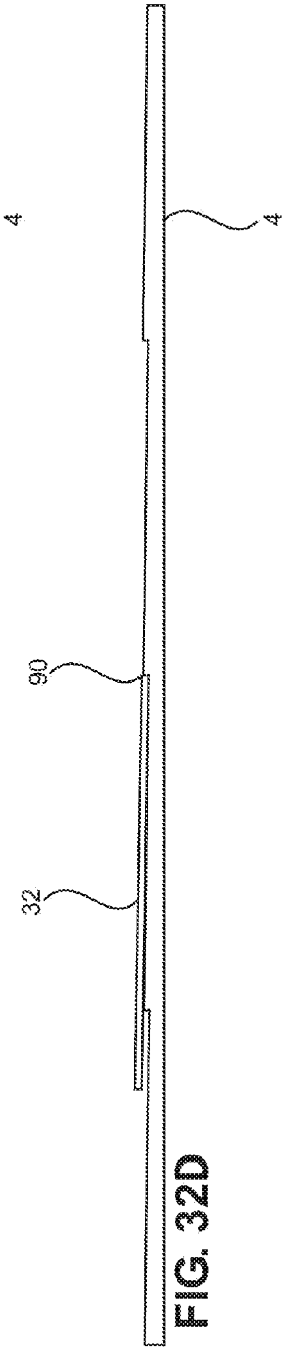

FIGS. 32A through 32D illustrate other mechanisms by which subject pieces might be easily and properly aligned. FIG. 32A shows a cross-sectioned side view of window 4. Here, window 4 has been molded so that its upper surface has ridges 89 that run horizontally across the entire surface from side to side. As in FIG. 32B, recesses 90 adjacent to each ridge 89 are formed by a gradual bevel of surface 91 between each ridge 89. FIG. 32B illustrates one such bevel/recess/ridge 89, 90, 91 combination. Each recess 90 is parallel along its length to the bottom edge of window 4 and perpendicular to the sides of window 4. Therefore, as shown in FIG. 32D, if the bottom edge of a coded image member 32 is placed into recesses 90, its bottom edge will also be parallel to the bottom edge of window 4. Since the bottom edge of the window 4 is parallel to the shutter elements 12 of the belt 6, coded image members placed into any of the recesses 90 will be properly aligned to animate correctly. With recesses and ridges 89, 90 spaced at intervals along the upper surface of window 4, as shown in a foreshortened perspective in FIG. 32D, it would be possible to place coded image members in various locations onto the surface of window 4 and to allow the bottom edge of the coded image member to drop into the recess 90 and thus easily align the coded image member. The thickness of the window 4 at the point 5 of each ridge 89 is the same. In other words, each ridge 89 represents the maximum thickness of the window 4. Consequently, any coded image members or background sheets laid across multiple ridges 89 would lay perfectly flat and parallel in relation to shutter element belt 6. In such embodiments, background sheets 35 and the like may need to be contoured or applied after coded image members are installed to avoid covering the alignment ridges 89.

Figure 33:
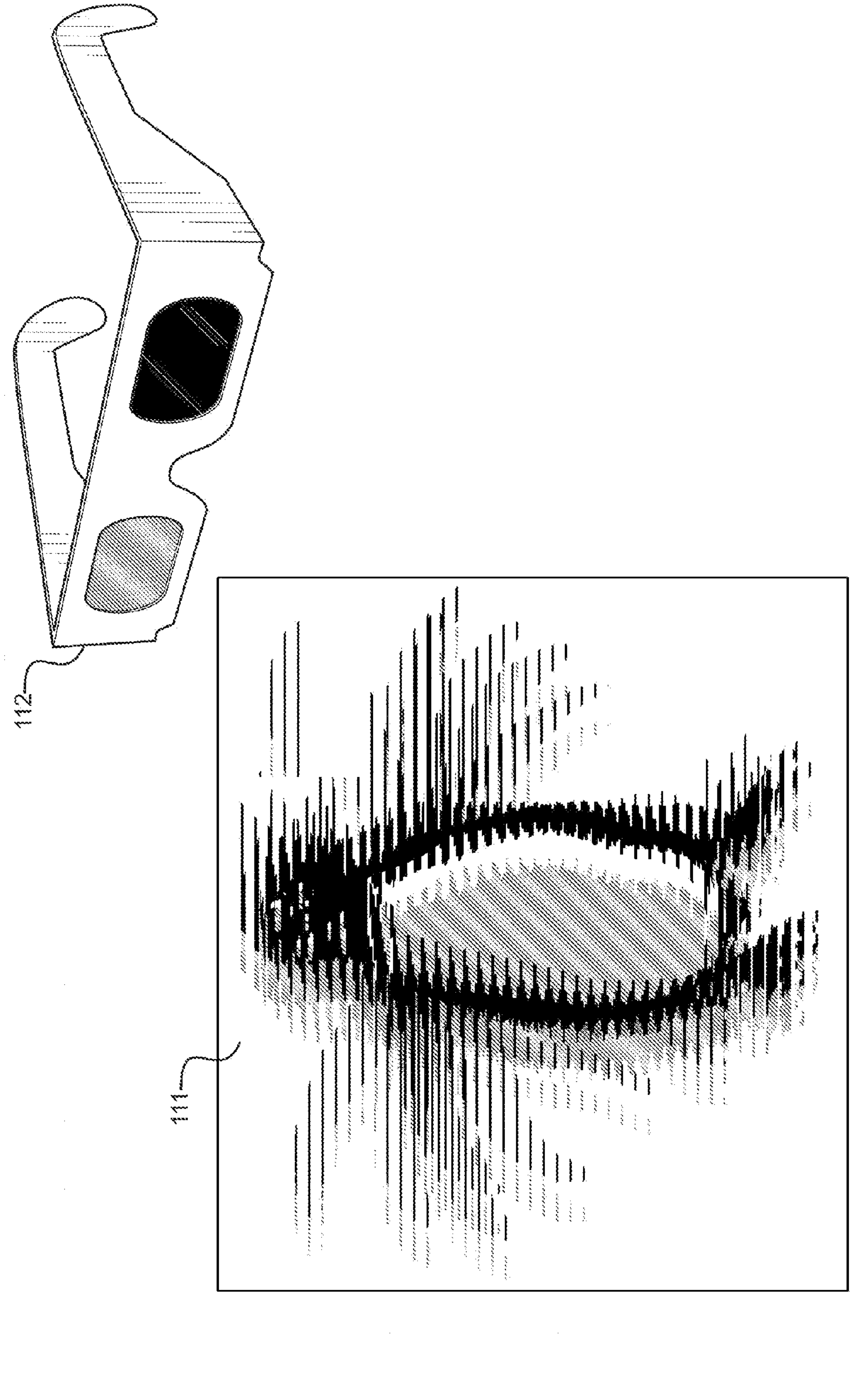
FIG. 33 is a perspective view of a stereoscopic manifestation of a coded image member and eyewear usable under the disclosed coded image display and animation system.

Still further embodiments of the display and animation system are contemplated. By way of example, a version of the system employing a stereoscopic coded image member and corresponding viewing eyewear is depicted in FIG. 33. A stereoscopic, three-dimensional effect can be achieved by using dedicated eyewear 112 in combination with anaglyph three-dimensional images 111 applied to a substrate to form a three-dimensional stereoscopic coded image. The stereoscopic eyewear 112 is encoded using filters of different, such as chromatically opposite colors. Red and cyan are typical. Anaglyph three-dimensional coded images 111 can be created by application of, for instance, two differently filtered colored images, one for each eye. When the anaglyph three-dimensional images 111 are viewed through the color-coded stereoscopic eyewear 112, each of the two coded images 111 reaches one eye to produce an integrated stereoscopic image. The visual cortex of the user's brain will thus fuse the viewed images into a perception of a three-dimensional scene or composition. Where the three-dimensional stereoscopic image 111 is placed upon window 4 and relative movement with respect to the shutter elements 12 is carried out, the image 111 will begin to animate to a viewer using the stereoscopic eyewear 112. Background sheets 35 can be similarly printed as anaglyph three-dimensional images. With this, the user can create three-dimensional designs and tableaus.

Figure 34:
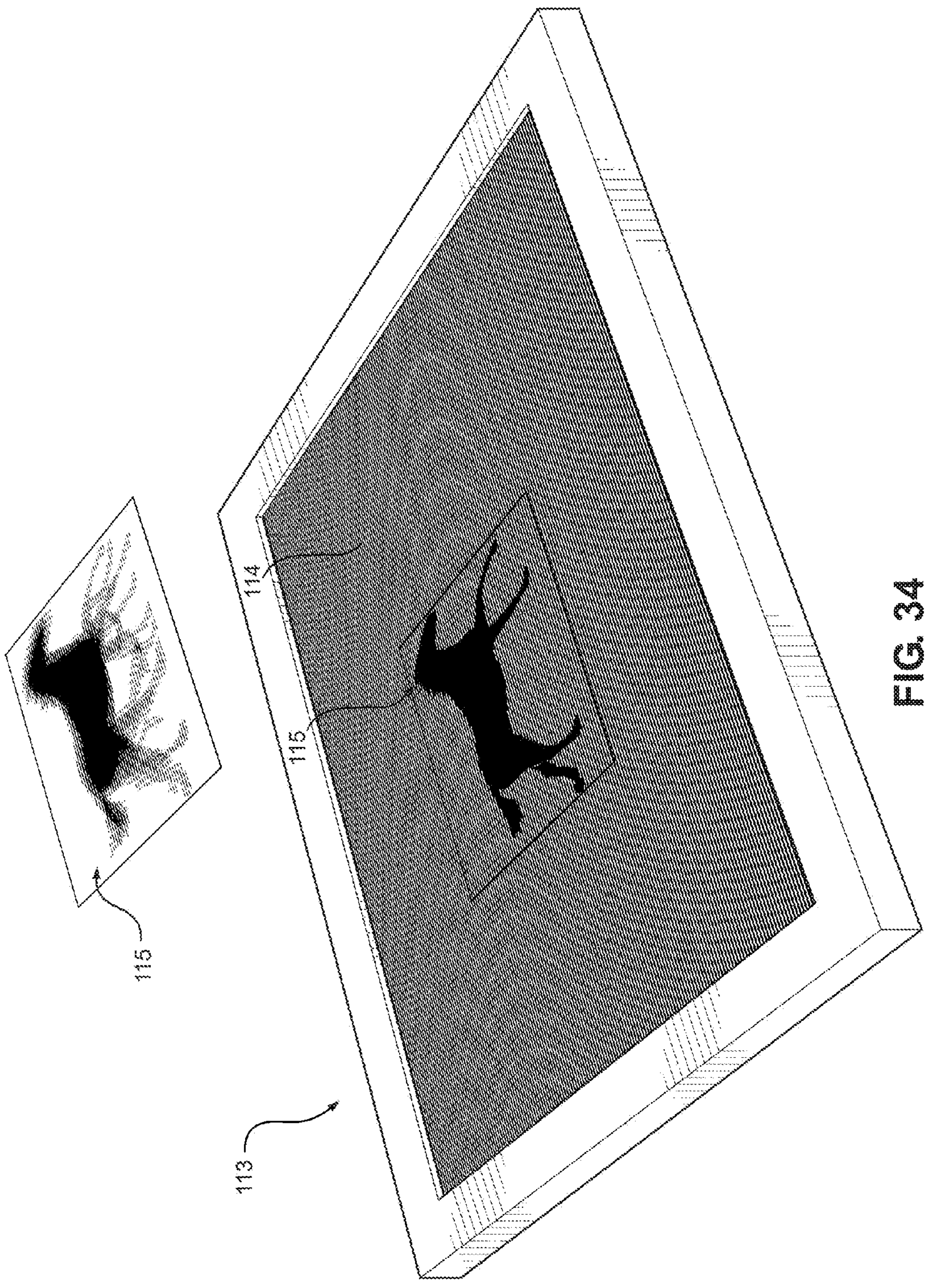
FIG. 34 is a perspective view of an embodiment of the coded image display and animation system embodied in relation to a personal computing device.

The invention should not be interpreted as being limited to mechanical shutter element devices 1. Indeed, embodiments are contemplated as in FIG. 34 wherein an electronic tablet device 113 or other device with an electronic display is substituted for the mechanically operating shutter element device 1 as shown in FIG. 1. The internal backlight of the electronic tablet 113 could serve the same function as the illumination source 28 of the device 1 as shown in FIG. 4, and the screen surface 114 of the electronic tablet 113 could serve the same function as the window 4 in device 1. Still further, moving shutter elements corresponding to the shutter elements 12 disposed on the belt 6 of the device 1 could be created in software running on the electronic tablet 113. Therefore, a coded image member 115, such as the galloping horse of FIG. 34, would animate when placed upon the screen of the tablet 113. Coded image members 115 could be arranged and moved, and designs and tableaus could be created much as described previously but on the surface of the electronic screen of the table 114.

Under each disclosed embodiment of the display and animation system, users can practice an inventive method of producing unique display and animation by, for instance, combining animated animals, people, colorful pattern pieces, such as hearts and stars, and motion backgrounds to create animated fantasy worlds of their choosing. The method could include, for instance, providing a shutter element device 1, whether it be mechanical or electronic, and providing one or a plurality of coded image members 32. The user could select one or more coded image members 32, and apply the one or more coded image members 32 in a desired layout on the window 4. The shutter element device 1 could then be actuated, such as by inducing operation of the motor-gearbox 25 to advance the belt or by starting a computer program that displays shutter elements 12 and interposed viewing elements 19. Details, additional steps, and variations to the method could be as described previously, including through the addition of background sheets 35, adding unique non-coded images to freehand drawing areas on background sheets 35 or elsewhere, such as with dry-erase markers or other drawing implements, or otherwise adding design elements to the display. Where the coded image members 32, the background sheets 35, and, additionally or alternatively, some other display article are mutually adherent, multiple coded image members 35 and other display articles can be selectively positioned and retained as a unit for so long as desired for future display and animation. Where dry-erase markers or other drawing implements are used, users can add their own drawings to the scenes. Licensed variations of the system could permit users to display and animate familiar characters and backgrounds. Furthermore, users can create their own monsters or robots from animated body parts, including arms, legs, eyes, mouths, and other parts. Moreover, animated inorganic parts, such as machine parts in the form of wheels, cams, and gears, can be animated. Still further, animated fantasy backgrounds and designs can be created.

With certain details and embodiments of the present invention for a coded image display and animation system disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall define the scope of protection to be afforded to the inventors. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, any such claims shall be construed to cover not only the corresponding structure and material expressly described in this specification but also all equivalents thereof.

We claim at least the following as deserving the protection of Letters Patent:

1. A coded image display and animation system comprising:

a shutter element device with a plurality of shutter elements and interposed viewing elements wherein the shutter element device comprises a display and animation window and a mechanism for displaying and enabling visually perceived movement of the shutter elements and the interposed viewing elements; and at least one coded image member for being selectively applied to the display and animation window of the shutter element device to produce a perception of animation in response to a perceived movement of the shutter elements and the interposed viewing elements wherein the at least one coded image member has at least one coded image thereon wherein the at least one coded image member is loose and not attached to the shutter element device;

wherein the display and animation window of the shutter element device comprises a panel of transparent material with a first surface to a first surface side of the display and animation window and a second surface to a second surface side of the display and animation window, wherein the first surface is open to receive the at least one coded image member on the first surface side of the animation window, and wherein the plurality of shutter elements and interposed viewing elements are disposed to the second surface side of the display and animation window;

whereby the at least one coded image member can be selectively rested on, positioned in relation to, and removed from the first surface of the display and animation window of the shutter element device and the at least one coded image on the at least one coded image member can be animated by a visually perceived movement of the shutter elements and the interposed viewing elements and whereby the panel of transparent material of the display and animation window is interposed between the at least one coded image member rested on the first surface of the display and animation window and the plurality of shutter elements and interposed viewing elements disposed to the second surface side of the display and animation window.

2. The coded image display and animation system of claim 1 wherein the mechanism for displaying and providing visually perceived movement of the shutter elements and the interposed viewing elements comprises an electronic display.

3. The coded image display and animation system of claim 1 wherein the mechanism for displaying and providing visually perceived movement of the shutter elements and the interposed viewing elements comprises a mechanical drive mechanism and wherein the plurality of shutter elements and interposed viewing elements are disposed on a shutter member.

4. The coded image display and animation system of claim 3 wherein the shutter member comprises a belt disposed in a continuous loop, wherein the plurality of shutter elements and interposed viewing elements are disposed on the belt, and wherein the belt is retained by first and second rollers.

5. The coded image display and animation system of claim 3 wherein the shutter member is disposed in substantial contact with the second surface of the animation window.

6. The coded image display and animation system of claim 5 wherein the shutter member comprises a belt disposed in a continuous loop, wherein the plurality of shutter elements and interposed viewing elements are disposed on the belt, wherein the belt is retained by first and second rollers, and wherein the second surface of the animation window is disposed proximal to a tangent line from the first roller to the second roller.

7. The coded image display and animation system of claim 5 wherein the at least one coded image on the at least one coded image member has a pitch and wherein the plurality of shutter elements and interposed viewing elements have a pitch greater than the pitch of the at least one coded image on the at least one coded image member.

8. The coded image display and animation system of claim 3 wherein the shutter element device further comprises a raised edge adjacent to the first surface of the display and animation window wherein the raised edge projects distal to the first surface.

9. The coded image display and animation system of claim 8 wherein the plurality of shutter elements and interposed viewing elements have an orientation and wherein the raised edge is substantially parallel or perpendicular to the orientation of the plurality of shutter elements and interposed viewing elements.

10. The coded image display and animation system of claim 9 wherein the at least one coded image member is rectangular and wherein the at least one coded image has coded images slices parallel to opposed edges of the at least one coded image member.

11. The coded image display and animation system of claim 1 wherein the plurality of shutter elements are approximately 1/16 inch wide and wherein the shutter element device produces visually perceived movement of the shutter elements at between 1/8 and 3/16 inches per second.

12. The coded image display and animation system of claim 1 wherein the plurality of shutter elements are approximately 1/32 inch wide and wherein the shutter element device produces visually perceived movement of the shutter elements at between 1/16 and 3/32 inches per second.

13. The coded image display and animation system of claim 1 wherein there are plural coded image members for being applied to the display and animation window of the shutter element device wherein each coded image member has at least one coded image thereon and wherein each of the plural coded image members is loose and not attached to the shutter element device whereby the plural coded image members can be selectively rested on, selectively positioned in relation to, and removed from the first surface of the display and animation window of the shutter element device and wherein the plural coded image members can be selectively combined and relatively positioned on the first surface of the display and animation window of the shutter element device.

14. The coded image display and animation system of claim 13 further comprising at least one display sheet for being rested on the first surface of the display and animation window wherein the at least one display sheet is loose and not attached to the shutter element device.

15. The coded image display and animation system of claim 14 wherein the display sheet has at least one coded image over at least a portion thereof.

16. The coded image display and animation system of claim 14 wherein the display sheet has at least one localized coded image portion with at least one coded image and at least one localized non-coded image portion without a coded image.

17. The coded image display and animation system of claim 16 wherein the non-coded image portion of the display sheet is decorated with a static image.

18. The coded image display and animation system of claim 16 wherein the non-coded image portion of the display sheet comprises a freehand drawing portion for receiving freehand drawings.

19. The coded image display and animation system of claim 13 wherein the display sheet has a size approximating a size of the display and animation window.

20. The coded image display and animation system of claim 14 wherein there are plural coded image members wherein the plural coded image members and the at least one display sheet are loose and not attached to the shutter element device whereby multiple coded image members can be applied to and retained by the at least one display sheet.

21. The coded image display and animation system of claim 1 wherein the at least one coded image member has at least one localized coded image portion with at least one coded image and at least one localized non-coded image portion without a coded image wherein the non-coded image portion comprises a freehand drawing portion for receiving freehand drawings.

22. The coded image display and animation system of claim 1 wherein there are plural coded image members wherein the plural coded image members are loose and not attached to the shutter element device and wherein each coded image member has a coded image portion thereon that is a portion of an overall animating image whereby the plural coded image members can be assembled into the overall animating image.

23. The coded image display and animation system of claim 22 wherein the plural coded image members are slidably interlocked.

24. The coded image display and animation system of claim 1 wherein there are plural coded image members, wherein the plural coded image members are loose and not attached to the shutter element device, and wherein each coded image member has a coded image portion thereon that is representative of at least a portion of a game piece of a board game.

25. The coded image display and animation system of claim 1 wherein the at least one coded image member is three-dimensional with a coded image portion and a contoured non-coded image portion.

26. The coded image display and animation system of claim 1 further comprising at least one spacer member that is rectangular in shape the at least one spacer member configured to be rested on the first surface of the animation window of the shutter element device.

27. The coded image display and animation system of claim 1 wherein the plurality of shutter elements and interposed viewing elements are disposed with a given orientation; and wherein the first surface has at least one ridge aligned with the orientation of the plurality of shutter elements and interposed viewing elements.

28. The coded image display and animation system of claim 1 wherein there are plural coded image members wherein the plural coded image members are loose and not attached to the shutter element device and further comprising an alignment sheet for being rested on the first surface of the display and animation window wherein the alignment sheet has a plurality of pockets for selectively retaining selected coded image members from among the plural coded image members.

29. The display and animation device of claim 1 further comprising a light source disposed distal to the plurality of shutter elements and viewing elements in relation to the display and animation window and further comprising a diffusion sheet of translucent material disposed between the light source and the plurality of shutter elements and viewing elements.

30. A coded image display and animation system comprising:

a shutter element device with a plurality of shutter elements and interposed viewing elements wherein the shutter element device comprises a display and animation window and a mechanism for displaying and enabling visually perceived movement of the shutter elements and the interposed viewing elements; and a plurality of coded image members for being selectively rested on the display and animation window of the shutter element device to produce a perception of animation in response to a perceived movement of the shutter elements and the interposed viewing elements wherein each of the plurality of coded image members has at least a portion comprising a flat panel with at least one coded image thereon and wherein each of the plurality of coded image members is loose and not attached to the shutter element device;

wherein the display and animation window of the shutter element device comprises a panel of transparent material with a first surface to a first surface side of the display and animation window and a second surface to a second surface side of the display and animation window, wherein the first surface is open to receive the at least one coded image member on the first surface side of the animation window, and wherein the plurality of shutter elements and interposed viewing elements are disposed to the second surface side of the display and animation window;

whereby the coded image members can be selectively rested on, positioned in relation to, and removed from the first surface of the display and animation window of the shutter element device and the coded images of coded image members so applied can be animated by a visually perceived movement of the shutter elements and the interposed viewing elements and whereby the panel of transparent material of the display and animation window is interposed between coded image members rested on the first surface of the display and animation window and the plurality of shutter elements and interposed viewing elements disposed to the second surface side of the display and animation window.

31. The coded image display and animation system of claim 30 wherein at least one of the plurality of coded image members is rectangular and has coded images slices parallel to opposed edges of the at least one coded image member.

32. The coded image display and animation system of claim 30 further comprising at least one display sheet for being rested on the display and animation window wherein the at least one display sheet is loose and not attached to the shutter element device.

33. The coded image display and animation system of claim 32 wherein the display sheet has at least one localized coded image portion with at least one coded image and at least one localized non-coded image portion.

* * * * *